US011703209B2

(12) United States Patent
Melzner et al.

(10) Patent No.: US 11,703,209 B2
(45) Date of Patent: Jul. 18, 2023

(54) SPOTLIGHT SYSTEM, SPOTLIGHT, OPTICAL COMPONENT THEREFOR AND METHOD OF DETERMINING A SPATIAL LIGHT DISTRIBUTION OF THE SAME

(71) Applicant: Arnold & Richter Cine Technik GmbH & Co. Betriebs KG, Munich (DE)

(72) Inventors: Erwin Melzner, Frasdorf (DE); Michael Koch, Mainz (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 146 days.

(21) Appl. No.: 17/218,323

(22) Filed: Mar. 31, 2021

(65) Prior Publication Data

US 2021/0310636 A1 Oct. 7, 2021

(30) Foreign Application Priority Data

Apr. 2, 2020 (DE) ......................... 102020109190.7

(51) Int. Cl.
*F21V 14/02* (2006.01)
*H05B 47/155* (2020.01)
(Continued)

(52) U.S. Cl.
CPC ................ *F21V 14/02* (2013.01); *F21V 9/08* (2013.01); *F21V 23/04* (2013.01); *H05B 47/155* (2020.01);
(Continued)

(58) Field of Classification Search
CPC . F21V 14/02; F21V 9/08; F21V 23/04; F21V 17/002; F21V 14/04; F21V 17/10;
(Continued)

(56) References Cited

U.S. PATENT DOCUMENTS 5,029,992 A 7/1991 Richardson
5,658,062 A 8/1997 Lee et al.
(Continued)

FOREIGN PATENT DOCUMENTS

DE 202006007227 U1 7/2006
DE 202012013045 U1 9/2014
(Continued)

OTHER PUBLICATIONS

European Search Report dated Sep. 16, 2021 in connection with European Patent Application No. 21165000.7.
(Continued)

*Primary Examiner* — Daniel D Chang
(74) *Attorney, Agent, or Firm* — Amster, Rothstein & Ebenstein LLP

(57) ABSTRACT

A spotlight system for illuminating a film or stage environment comprises a spotlight for generating light; and at least one optical component couplable to the spotlight for producing at least one spatial light distribution, wherein the optical component and/or the spotlight has/have a memory in which information on the spatial light distribution producible by the optical component is stored.

29 Claims, 13 Drawing Sheets

Figure 1A:
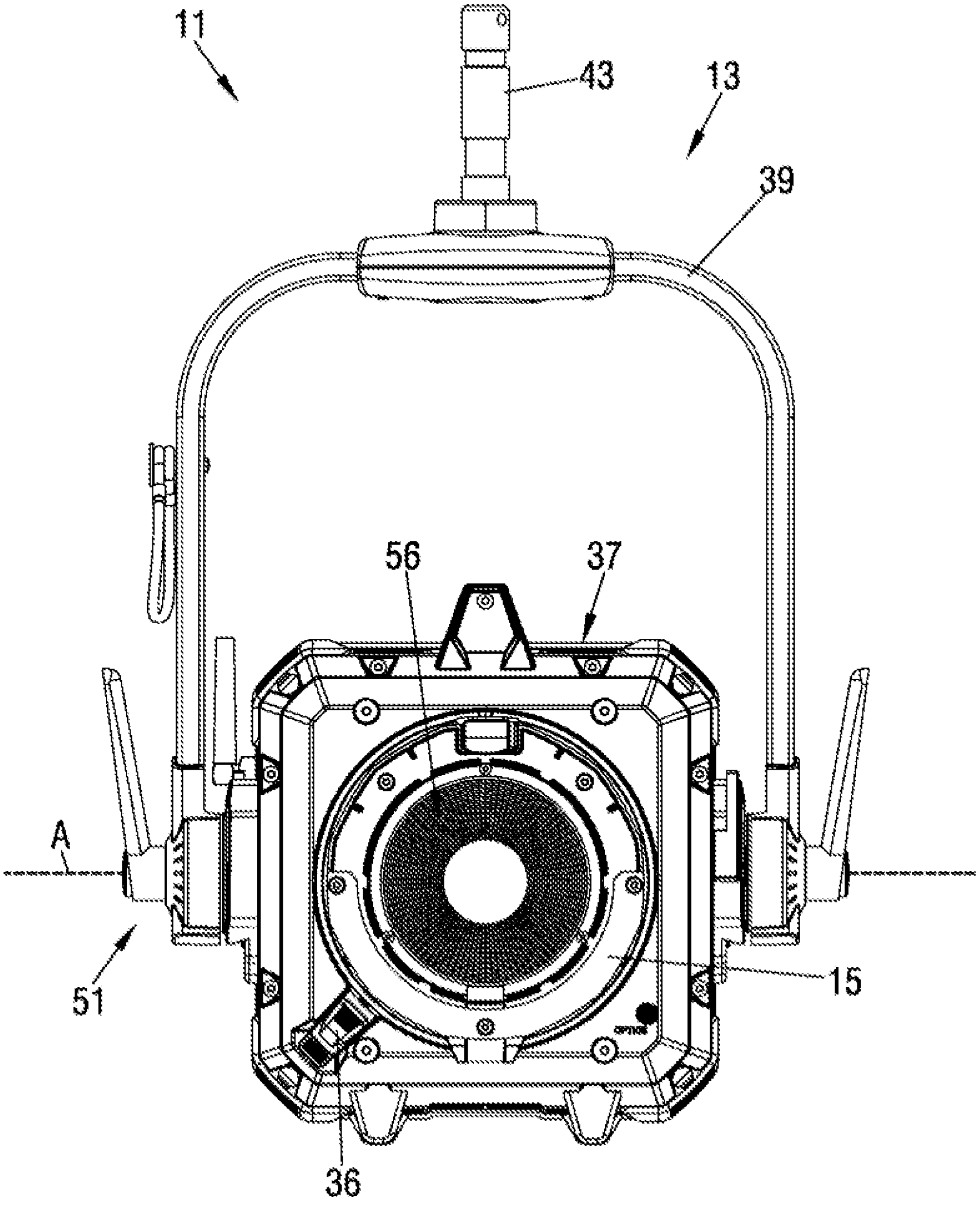

(51) Int. Cl.

| | |
|---|---|
| ***H05B 47/165*** | (2020.01) |
| ***F21V 9/08*** | (2018.01) |
| ***F21V 23/04*** | (2006.01) |
| ***F21W 131/406*** | (2006.01) |

(52) U.S. Cl.
CPC ..... *H05B 47/165* (2020.01); *F21W 2131/406* (2013.01)

(58) Field of Classification Search
CPC ............... H05B 47/155; H05B 47/165; F21W 2131/406; F21W 2131/105; F21W 2131/407; F21S 10/026; F21Y 2105/18; H04L 65/40
See application file for complete search history.

(56) References Cited

U.S. PATENT DOCUMENTS

| | | | | |
|---|---|---|---|---|
| 8,670,024 | B2 | 3/2014 | Steurer | |
| 9,562,672 | B2 | 2/2017 | Jørgensen et al. | |
| 10,801,703 | B2 | 10/2020 | Melzner | |
| 2016/0040837 | A1 | 2/2016 | Kallas et al. | |
| 2018/0176521 | A1 | 6/2018 | Laduke | |
| 2018/0347788 | A1 * | 12/2018 | Vilem | G02B 7/08 |
| 2019/0383470 | A1 | 12/2019 | Hendricks et al. | |

FOREIGN PATENT DOCUMENTS

| | | | | |
|---|---|---|---|---|
| DE | 10 2015 110 003 | A1 | 12/2016 | |
| DE | 10 2017 119 944 | A1 | 2/2019 | |
| EP | 1 234 140 | B1 | 8/2005 | |
| EP | 3 229 055 | A1 | 10/2017 | |
| EP | 3229055 | A1 * | 10/2017 | G02B 13/16 |
| EP | 3 450 837 | A1 | 3/2019 | |
| WO | 2012032465 | A2 | 3/2012 | |

OTHER PUBLICATIONS

Search Report dated Nov. 18, 2020 in connection with German Patent Application No. 10 2020 109 190.7.
ARRI Orbiter LED Fixture Data Sheet Sep. 2019, 2 pages.
ARRI Orbiter LED Fixture Product Brochure Sep. 2019, 17 pages.

* cited by examiner

SPOTLIGHT SYSTEM, SPOTLIGHT, OPTICAL COMPONENT THEREFOR AND METHOD OF DETERMINING A SPATIAL LIGHT DISTRIBUTION OF THE SAME

The invention relates to a spotlight system for illuminating a film or stage environment, said spotlight system comprising a spotlight for generating light; and at least one optical component, couplable to the spotlight, for producing at least one spatial light distribution.

The invention further relates to an optical component for a spotlight for illuminating a film or stage environment; to a spotlight for generating light for illuminating a film or stage environment comprising a coupling device by means of which at least one replaceable optical component for producing at least one spatial light distribution may be coupled to the spotlight; to a spotlight for generating light for illuminating a film or stage environment comprising an integrated optical component for producing at least one spatial light distribution; and to a method of determining a spatial light distribution of a spotlight system.

Such spotlight systems may, for example, be used to light a film or stage environment during a shooting of a film scene (e.g. in a studio) or during a theatrical performance. In this respect, the spotlight systems may comprise a spotlight that has a lighting device to generate light of a desired brightness and color. A spotlight of the type in question here is typically arranged in a stationary manner and configured for the generation of a permanent lighting. An optical component coupled or couplable to the spotlight may be provided to produce a spatial light distribution that is coordinated with the scene recorded or played. For example, it may be desired on a recording of a specific scene to direct the light generated by a spotlight in a focused manner onto a circular or elliptical area to clearly highlight a specific region and, for example, an actor in such a spot setting. Alternatively, provision may, for example, be made to light a relatively large area uniformly in a flood setting of the spotlight system and to bring about a smooth transition of the light conditions at the edges of the lit area.

To enable such settings as well as a transition between different spatial light distributions, optical components may, for example, comprise lenses (stepped lenses or continuously formed lenses), projection lenses, reflectors (for directional or diffuse reflection), diffusor lenses, or filters that are movable relative to a lighting device or to one or more illuminants of the spotlight along its optical axis. A reflector may in this respect in particular be configured as a continuous mirror, wherein it is also possible to design a reflector divided into a plurality of segments. Due to such setting possibilities of the optical component, a flexible use of the spotlight system and the producing of different spatial light distributions, in particular also with continuous transitions, is made possible without the spotlight system or parts thereof having to be replaced, for example. Furthermore, a spotlight may be couplable to a plurality of different optical components so that various spatial light distributions may be produced by the same spotlight in dependence on the respective coupled optical component and its setting in order to be able to ideally adapt the spatial light distribution to a scene to be recorded.

Due to these numerous setting possibilities and the influence of the respective produced spatial light distribution on the impression of a scene, there is a need to be able to obtain and collect data or information on the spatial light distribution that may be produced by the spotlight system or the optical component. Such data could, for example, in particular provide possibilities for an improved postprocessing of a film scene in postproduction. Similarly, the knowledge of a spatial light distribution that may be produced by means of an optical component could, for example, enable simulations of the light conditions before the start of shooting in order already to be able to determine suitable settings in advance.

It is therefore an object of the invention to provide a spotlight system that can be used in a flexibly and versatile manner with a possibility of obtaining, providing, and utilizing data on the spatial light distributions that may be produced by means of an optical component of the spotlight system.

In accordance with a first aspect of the invention, this object is satisfied by a spotlight system having the features of claim 1 and in particular in that the optical component and/or the spotlight has/have a memory in which information on the spatial light distribution that may be produced by the optical component is stored.

The optical component of the spotlight system thus serves to produce a specific spatial light distribution from the light output by the spotlight in a state coupled to the spotlight. In this respect, the optical component determines—at least in part—the spatial distribution of the light produced by the spotlight or of the light output by the spotlight system. The producible spatial light distribution may in particular depend on the design of the optical component, for example on an arrangement of lenses, reflectors, mirrors or filters, and on its setting, for example on a spacing of a lens from the illuminants of a spotlight. Accordingly, the information on the spatial light distribution producible by the optical component may in particular correspond to a geometrical and/or spectral light shaping characteristic of the optical component.

Since the memory provides information on the producible spatial light distribution, data on the spatial light distribution that is or may actually be produced may be determined and may, for example, be made available to postproduction, taken into account during postprocessing, and/or taken into account during a replanning of a film shooting.

In general, the stored information mentioned in connection with the various aspects of the invention may directly describe the producible spatial light distribution, for which purpose the spatial light distribution may, for example, be stored in the memory directly or in a parameterized manner, for instance in the form of a look-up table, and/or the stored information may comprise calculation rules, in particular instructions and/or calculation parameters, that at least approximately enable a calculation of the spatial light distribution. The stored information may thus provide an approximation of the spatial light distribution that may actually be produced and/or may enable a determination by calculation of such an approximation.

Possible embodiments of the invention can be seen from the claims, from the following description, and from the drawings.

To be able to obtain data on the spatial light distribution and output them from the spotlight system, the memory may generally be readable. The memory may in particular be a non-volatile electronic memory (e.g. EEPROM).

In some embodiments, the information may be stored in a memory of the optical component. The information may in this respect be transmitted to the spotlight via an interface if the optical component is coupled to the spotlight. The spotlight may further have a calculation device that is configured to determine (e.g. look up and/or calculate) the spatial light distribution that may be produced or that is produced on the basis of the transmitted information and that may in particular be configured as a microprocessor. The determined result may thereupon be forwarded to the outside, for example to an external data collection device, via a further interface of the spotlight so that the data on the spatial light distribution may be used for further steps of the processing. In this respect, the output of the calculated spatial light distribution to the outside may take place in a wireless or wired manner. The information itself or other data stored in the memory may also be transferable to the outside via the interfaces.

Alternatively or additionally thereto, the optical component may, for example, itself comprise such a calculation device that is configured to determine the spatial light distribution that may be produced or that is produced by the optical component on the basis of the information stored in the memory of the optical component. The spatial light distribution determined within the optical component may thereupon, for example, be transmitted to the spotlight via an interface and may be provided in a readable manner by the spotlight via a further interface to be able to be taken into account in postproduction or in preparatory simulations. In this respect, a direct transmission of the data describing the producible spatial light distribution is also possible to the outside via an interface of the optical component.

Any determination of the producible spatial light distribution may generally also take place in a plurality of steps on the basis of the stored information, such that both the optical component and the spotlight may have a respective calculation device. In this respect, a first result determined by the calculation device of the optical component may be transmitted to the spotlight via an interface, wherein the calculation device of the spotlight may be configured to determine the producible spatial light distribution on the basis of this first result. The spatial light distribution determined by the calculation device of the spotlight may thereupon be able to be output to the outside via an interface, in particular a further interface.

Provision may furthermore be made that the information from the memory of the optical component is merely transmitted to the outside via an interface without a further determination or calculation of the spatial light distribution taking place within the spotlight system. This may, for example, be provided if the stored information directly reproduces the producible spatial light distribution, for example in the form of a look-up table, and data describing the spatial light distribution may thus be provided without any additional calculation steps. It is equally possible that a calculation for determining the spatial light distribution is performed by an external device on the basis of the information transmitted to the outside via the interfaces, wherein, for example, a transmission to a mobile device or a smartphone comprising a light planning app or a light evaluation app or to a central device for collecting and processing metadata may be provided. The interface may in this respect be arranged at the optical component or provision may be made that the information is first transmitted via a first interface to the spotlight and is thereupon transmitted via a second interface to the outside.

The memory comprising the information on the spatial light distribution producible by the optical component may also be part of the spotlight. In this respect, the spotlight may, for example, have a detection device or a selection device by means of which a respective coupled optical component may be automatically recognized or the selected optical component may be input by a user. For an automatic detection, the couplable optical components may, for example, have a respective readable coding that enables an identification of the optical component on a coupling to the spotlight. Respective information on the spatial light distributions that may be produced by means of the optical components may be stored in the memory of the spotlight for a plurality of couplable optical components, such that the corresponding information may be taken from the memory after an identification or a selection of the coupled optical component. The information may in turn, for example, be used by a calculation device of the spotlight to determine the spatial light distribution that may be produced or is produced or the information itself may directly reproduce the producible spatial light distribution. Both any calculated light distribution and the stored information itself may be transmittable to external devices via an interface of the spotlight.

Independently of the embodiments described above and the arrangement of the memory, a spotlight system having a memory, in which information on the producible spatial light distribution is stored, thus generally makes it possible to determine the spatial light distribution that may be produced or that is produced and to make the corresponding data available for further processing or consideration. In this respect, further properties of the optical component of the spotlight system may in particular also be stored in the memory, for example a serial number or an article number of the optical component, to be able to forward light data that are as complete and comprehensive as possible. For example, a luminosity to light flux gain factor of the optical component, measured temperature values of critical components, spatial positions of components that influence light, and/or data on the dimensions of the optical component or of the light exit surface may be stored in the memory and may thereby be retrievable.

The producible spatial light distribution may generally be transmitted in a common data set together with other data transmitted to the outside by the spotlight system so that light data that are as complete as possible may be provided to postproduction. In principle, provision may in this respect initially be made to transmit light distribution data in an EULUMDAT format (with a .LTD or .IES file extension) or in a similar format. To be able to transmit further metadata, as explained, for example temperature measurement values or a serial number of the optical component, with such light distribution data in a common data set, the EULUMDAT data may in particular be combined in a more comprehensive data format with the further metadata. For example, a compilation of the data in a material exchange format (file extension .MFX) may be provided to simplify a further processing.

In some embodiments, provision may be made that the stored information represents a spatial brightness distribution and/or a spatial color distribution or spatial spectral distribution producible by the optical component. For example, the information may reproduce the light incident on respective spatial points when the optical component is coupled. For this purpose, the stored information may, for example, comprise a look-up table that associates a respective brightness value to a plurality of predefined or predefinable spatial points that represents the light incident on this spatial point. Furthermore, such look-up tables may, for example, be created for different wavelength ranges of the light (i.e. for different spectral ranges or ranges in a color space), such that a producible spatial color or spectral distribution may be determined on the basis of the information. Any changes in the emission spectrum of the spotlight system or in the color of the light generated by the spotlight system that are caused by the optical component may in particular be identifiable or localizable on the basis of information on a producible spatial color or spectral distribution so that such changes may, for example, be able to be taken into account in the setting of the spotlight or of its lighting device. In addition to a look-up table, provision may also be made that the stored information comprises a calculation rule by means of which the spatial light distribution that may be produced, in particular a spatial brightness distribution and/or a spatial color or spectral distribution, may be calculated.

To represent a spatial color distribution, the stored information may make it possible to associate a color location in a color space to different spatial points. For example, the information may for this purpose comprise a look-up table that associates respective coordinates of a color space (in particular a three-dimensional space) to a plurality of spatial points. A color location in the color space may thus be associated with each of the spatial points so that a spatial color distribution results from the look-up table. In this respect, a color location within a three-dimensional color space may already be sufficiently determined by only two coordinates so that a look-up table, for example, only has to include an x coordinate and a y coordinate, with the third coordinate (z coordinate) being determined by calculation. Alternatively, the three coordinates of the three-dimensional color space (x, y, and z coordinates) may also be included in the look-up table. Instead of a look-up table, the stored information may also comprise a corresponding calculation rule in order to determine a spatial color distribution.

Consequently, a spatial color distribution in the sense of the present disclosure describes a spatial distribution of color values or color locations. In this respect, different points in a space are assigned one or more values that represent the color of the light incident on this point. A specific spectral resolution of the incident light, in contrast, does not take place by a spatial color distribution. In this respect, a spatial color distribution may be understood as a simplification of a spatial spectral distribution. However, a spatial color distribution may simultaneously also include a spatial brightness distribution.

A spatial spectral distribution in the sense of the present disclosure consequently describes the producible spatial light distribution not only in a spatially resolved manner (in accordance with a plurality of spatial points), but also in a spectrally resolved manner so that wavelength-dependent information on the amount of light (relative distribution or absolute values; related to luminosity, for example) is present with respect to a respective spatial point for one or more wavelength ranges. In this respect, the spatial spectral distribution thus comprises extended or more precise information compared to a spatial color distribution.

Furthermore, the stored information may represent a half-scatter angle, a one-tenth scatter angle, a beam angle, or a similar property of the optical component. Such information may also make it possible, at least approximately, to determine the producible spatial light distribution of the optical component and to approximately take into account the producible spatial light distribution in further steps of the postproduction.

In some embodiments, the stored information may parameterize a measured spatial light distribution that may be produced by the optical component. For example, in a calibration step, in particular an ex works calibration step, a spatial brightness distribution may be measured when the optical component is coupled to the spotlight and may be stored in the memory in the form of value tuples of spatial points and measured brightness values or a look-up table. Furthermore, such a measured spatial light distribution may be parameterized as a function, for example by means of a fit, and the determined parameter values as well as the functional relationship may be stored as information in the memory.

In some embodiments, the spotlight system may have an interface that is configured to output the stored information or values derived therefrom. Such an interface, which may in particular be configured as an electronic interface, may in this respect make it possible to forward the stored information or, for example, a calculation result for approximating the producible spatial light distribution to the outside so that the data obtained on the spatial light distribution may be used. Both a wired transmission and a wireless transmission may be provided in this respect. In connection with the invention, such an interface may, for example, comprise an electrical plug, an electrical socket, a radio transmitter or a radio transmission/reception unit, in particular together with an associated controller for controlling the communication or for signal conversion. Transmission to or reading by a central data collection device may in particular be provided at which, for example, data of other devices involved in a shoot may also be collected to create metadata that are as comprehensive as possible. The interface may be formed at the spotlight or at the optical component.

In some embodiments, the spatial light distribution producible by the optical component may be variable by setting at least one optics setting parameter. For example, the optical component may comprise a (stepped) lens; a reflector; or a mirror that is movable relative to the spotlight or its lighting device, wherein a half-scatter angle of the optical component may, for example, vary in dependence on this spacing. In this respect, provision may be made that the stored information comprises a description of the dependence of the producible spatial light distribution on variable values of the optics setting parameter so that the respective spatial light distribution producible at a specific value of the optics setting parameter of such a flexibly usable optical component may be determined. In this respect, a set value of the optics setting parameter may, for example, be measured by means of a sensor arranged at the spotlight or at the optical component, wherein, for example, a measured spacing between a (stepped) lens and the illuminants of a spotlight may be converted into a half-scatter angle and the half-scatter angle may be taken into account as the optics setting parameter. The setting of the at least one optics setting parameter may generally take place by means of a manually actuable adjustment device (that is by hand) or by means of an electrically controllable adjustment device (e.g. an electric motor).

The stored information may generally comprise a description of the dependence of the producible spatial light distribution directly on parameters such as said spacing of a (stepped) lens from the illuminants of a spotlight or a spacing of a plurality of lenses of an optical component from one another. It is thus not absolutely necessary that such optics setting parameters directly related to the setting of the optical component are first converted into a characteristic angle resulting from this setting. In this respect, in the sense of the present disclosure, a taking into account of a half-scatter angle as an optics setting parameter generally also takes place when its value is not, for example, directly used in a calculation of the producible spatial light distribution or is queried in a look-up table, but an optics setting parameter that has an effect on the half-scatter angle is rather determined and is used to determine the spatial light distribution. A taking into account of said spacings of optical elements of the optical component from one another or from a lighting device may in particular be considered in this respect.

Provision may be made that the stored information comprises at least a first piece of information that represents the spatial light distribution producible by the optical component at a first value of the optics setting parameter; and a second piece of information that represents the spatial light distribution producible by the optical component at a second value of the optics setting parameter. For example, the information may comprise at least one respective parameterization of a measured spatial light distribution that may be produced by the optical component at the first and second values of the optics setting parameter. Respective look-up tables having spatial points and light incident on these spatial points may in this respect in particular be stored for discrete values of the optics setting parameter to be able to determine the spatial light distribution at a respective value of the optics setting parameter. For discretely settable optical components, such tables may in this respect be stored for each settable value of the optics setting parameter. With respect to continuously variable optical components, provision may, for example, be made to approximate the spatial light distribution that may be produced at a specific value by that measured spatial light distribution which was measured at a value of the optics setting parameter that is closest to the value actually set or selected.

In some embodiments, the stored information may comprise a calculation rule for determining the spatial light distribution in dependence on a set value of the optics setting parameter. Such a calculation rule may in particular make it possible to determine the spatial light distribution producible at a value of the optics setting parameter between the first value and the second value of the optics setting parameter as an approximation, wherein the respective producible light distributions may be measured at the first and second values of the optics setting parameter. In this respect, the calculation rule may define a rule for interpolation between two spatial light distributions measured at respective values of the optics setting parameter, wherein, for example, a simple linear interpolation may be provided between the first and second spatial light distribution or respective measured spatial light distributions. This may in particular enable a very fast determination and the provision of data on the spatial light distribution in real time. Provision may furthermore be made that the calculation rule enables a determination of the producible spatial light distribution on the basis of one or more physical models.

Furthermore, in some embodiments, the calculation rule may comprise at least one respective polynomial interpolation for a plurality of spatial points that describes the dependence of a portion of the producible light distribution at the respective spatial point on the optics setting parameter. In this respect, spatial light distributions measured at different values of the optics setting parameter may in particular serve as supporting points for the polynomial interpolations, wherein a reliable approximation of the spatial light distribution in dependence on the optics setting parameter may be provided by such polynomial interpolations with an adequate calculation effort and without having to make use of complex physical models. These polynomial interpolations or their parameters may in particular already be determined in an ex works calibration step or parameterization step and stored in the memory together with the corresponding spatial points so that these calculation steps and the time effort associated therewith only have to be performed once and in particular not by the user of the spotlight system himself.

Provision may furthermore be made that the calculation rule comprises a respective plurality of polynomial interpolations for the plurality of spatial points, wherein a respective polynomial interpolation describes the dependence of the light distribution at the respective spatial point on the value of the optics setting parameter in a specific wavelength range. This may make it possible to determine the spatial color distribution or spatial spectral distribution in dependence on the optics setting parameter by means of the plurality of polynomial interpolations and to use the data obtained in further steps of film production, in particular postproduction.

In some embodiments, the spotlight system may have a calculation device that is configured to at least approximately determine the spatial light distribution producible by the optical component on the basis of the information stored in the memory. In this respect, the calculation device, for example as a microprocessor, may be part of the spotlight or of the optical component, wherein a multistage determination may generally also be provided and the calculation device may be distributed over the spotlight and the optical component. The memory may accordingly be connected or connectable to the calculation device so that the information stored in the memory may be provided to the calculation device. A calculation device associated with the spotlight may in particular be connectable to the memory, wherein this connection may, for example, be automatically generated as a result of a coupling of the optical component to the spotlight. Furthermore, provision may also be made that an external device has a calculation device that may be connectable to the spotlight system, in particular to the spotlight, to read the memory. For example, such an external calculation device may be provided as part of a light planning app that may, for example, be executable by a mobile device or a smartphone.

Provision may be made that the calculation device is configured to take into account a value of at least one settable light parameter of the spotlight system in the determination of the spatial light distribution producible by the optical component. The calculation device may in particular be configured to take into account a settable value of an optics setting parameter of the optical component, for example a half-scatter angle, in the determination of the spatial light distribution producible by the optical component. In this respect, in the determination of the spatial light distribution, the calculation device may, for example, make use of the already mentioned polynomial interpolations for approximating the portion of light attributable to a respective spatial point in dependence on the optics setting parameter and may insert a respective value of the optics setting parameter into the corresponding polynomial interpolations for a plurality of spatial points in order to determine an approximation of the produced spatial light distribution at this value of the optics setting parameter. Alternatively, the calculation device may, for example, be configured to interpolate between respective measured reference light distributions and thereby to determine an approximation of the spatial light distribution at a specific value of the optics setting parameter. Provision may in particular be made that the calculation device for determining an approximation of the spatial light distribution that may be produced or that is produced only performs additions and/or subtractions so that the determination may take place quickly and easily, in particular in real time.

Furthermore, the settable parameter, under whose consideration the calculation device may perform the determination of the producible spatial light distribution, may relate to a setting of the spotlight or of a lighting device of the spotlight, in particular to a brightness or a color that may be generated by the spotlight. To adapt such settings, the spotlight may have a controllable lighting device. For example, a spotlight may be configured in dependence on a control of such a lighting device to generate light only with a selection from a plurality of illuminants or to generate light in different colors so that in particular a spatial color distribution or spatial spectral distribution producible by means of the spotlight system via the optical component may change in dependence on a setting of the lighting device. A set value of such a light setting parameter may thus also be taken into account in the determination of the producible spatial light distribution to be able to obtain and forward data that are as precise as possible.

In some embodiments, the spotlight may have a plurality of illuminants, in particular a plurality of light-emitting diodes, wherein an activation state may be settable for each illuminant and/or a common activation state may be settable for a group of illuminants; wherein the settable activation state of each illuminant may, for example, comprise a switched-on state, a switched-off state, a switched-on state with a selected (high or low) brightness, and/or a switched-on state with a selected emission spectrum; and wherein the calculation device may be configured to determine the spatial light distribution that may be produced by the optical component in dependence on the set activation states of the illuminants.

In such spotlights, the emission spectrum may, for example, be indirectly spatially influenced by switching on a certain selection of illuminants while the other illuminants are switched off. Such settings of the spotlight may thus have a direct influence on the spatial light distribution that may be produced by the optical component. Furthermore, a producible spatial color or spectral distribution may in particular depend on the respective emission spectra of the individual illuminants. Since the calculation device may be configured to take such settings of the spotlight into account in the determination of the spatial light distribution, data on the actually producible spatial light distribution that are as accurate as possible may consequently be determined and may, for example, be taken into account in postproduction. Each of the illuminants may in this respect generally be individually controllable and may be settable into a desired activation state, whereas it is also possible to provide the illuminants of the lighting device divided into a plurality of groups, wherein a common activation state may be settable for the illuminants of a group. Such a group of illuminants may, for example, comprise a plurality of illuminants or all the illuminants of the same color channel and/or all the illuminants of an electrical series connection or parallel connection (common control).

In some embodiments, the spotlight system may have an interface that is configured to output the calculated spatial light distribution, in particular in a wired or wireless manner.

The determination of the spatial light distribution that may be produced or that is produced may in particular take place in accordance with the method that will be explained separately below.

In some embodiments, an article number, a serial number, a half-scatter angle, and/or a luminosity value of the optical component may be stored in the memory. Consequently, the memory may comprise further data in addition to the information on the producible spatial light distribution to be able to provide light data that are as complete as possible on the spotlight system and in particular on the couplable optical component. The memory may in this respect in particular also be directly readable by an external device via one or more interfaces when a determination of the producible spatial light distribution takes place within the spotlight system and its result is transmitted to the outside.

The stored information may furthermore comprise a spatial distribution of color adaptations that may be produced by means of the optical component. Thus, not only information on a producible spatial color or spectral distribution may be stored in the memory, but any color adaptations or changes of the emission spectrum of the spotlight may also be reproducible on a coupling of the optical component. Knowledge of such color changes, which are, for example, caused by reflection properties of the optical component and which may in particular also have a spatial dependence, may make it possible to carry out corrections through adapted settings of the spotlight already before a recording in order to obtain a desired color distribution.

In some embodiments, the spotlight may have a coupling device and the optical component may have a coupling section, wherein the optical component may be releasably fastenable to the coupling device of the spotlight via the coupling section. For example, the coupling device may have a plug-in connector, a rotary connector, a plug-in rotary connector, and/or a sliding connector, wherein the coupling section may have the mating piece therefor. Similarly, a reverse design of the coupling device and coupling section is possible. A form fit and/or a force fit may in this respect be provided between the coupling device and the coupling section. A reliable mechanical connection between the spotlight and the optical component may be brought about by such a coupling device and such a coupling section.

The spotlight system may furthermore comprise a plurality of different optical components of which a respective one may be selectively coupled to the spotlight. The aforementioned coupling device may in particular be provided to quickly and flexibly couple a selected optical component to the spotlight to be able to produce a desired spatial light distribution. In this respect, the spatial light distribution that may be produced by the coupled optical component may be determined on the basis of the stored information and may, for example, be provided to postproduction.

In accordance with a further aspect, the invention relates to an optical component for a spotlight for illuminating a film or stage environment, wherein the optical component is configured to be coupled to a spotlight, which is configured to generate light, and to produce at least one spatial light distribution, wherein the optical component has a memory in which information on the spatial light distribution producible by the optical component is stored.

Consequently, as explained above for the spotlight system, such an optical component makes it possible to determine the spatial light distribution that may be produced by means of the optical component on a coupling to a spotlight on the basis of the information stored in the memory. Thus, such an optical component may directly or indirectly provide the data in particular desired for postproduction with respect to the spatial light distribution.

In this respect, the stored information may represent a spatial brightness distribution and/or a spatial color distribution or spatial spectral distribution producible by the optical component.

In some embodiments, the optical component may have an interface via which the memory may be read. Such an interface may in particular be configured to establish a connection between the memory and devices arranged within the spotlight, for example, a calculation device for determining the producible spatial light distribution on the basis of the information, on a coupling of the optical component to a spotlight. Furthermore, the interface may be provided to be able to transmit the information stored in the memory or values derived therefrom directly or via the spotlight and a further interface to the outside, for example, to an external data collection device.

In some embodiments, the spatial light distribution producible by the optical component may be variable by setting the value of an optics setting parameter. In particular, a half-scatter angle of the optical component may in this respect be variable, for which purpose, for example, the spacing of a (stepped) lens of the optical component from an illuminant of a spotlight in the coupled state may be adaptable. For this purpose, the optical component and/or the spotlight may have an adjustment device that may be manually actuable or may be controllable via a control device of the spotlight or of the optical component. The information may furthermore, for example, comprise a calculation rule for determining the producible spatial light distribution in dependence on the optics setting parameter, as already explained above in connection with the spotlight system.

In some embodiments, the optical component may have a calculation device that is configured to at least approximately determine the spatial light distribution producible by the optical component on the basis of the information stored in the memory. The calculation device may in particular be configured to determine the producible spatial light distribution in dependence on a variable value of an optics setting parameter of the optical component, in particular a half-scatter angle. In this respect, the information may, for example, comprise an approximation of the producible spatial light distribution in dependence on the optics setting parameter and may in particular comprise the polynomial interpolations already mentioned on the basis of which the determination by the calculation device may take place.

In some embodiments, the calculation device may furthermore be configured to receive data from a coupled spotlight and to take said data into account in the determination of the producible spatial light distribution. For example, the coupled optical component may receive data from the spotlight or exchange data with the spotlight via an interface so that a brightness or color setting of the spotlight may, for example, be taken into account in the determination of the producible spatial light distribution.

The calculation device may be configured to transmit the calculated spatial light distribution to the coupled spotlight. This may in particular also take place via the interface already mentioned. The producible spatial light distribution or its determination may thus first be transmitted from the optical component to the coupled spotlight and may thereby move out of the optical component. The producible spatial light distribution may thereby, for example, be transmitted together with other data transmitted by the spotlight to the outside in a common data set. In an EULUMDAT format or in a similar format, light distribution data to be transmitted may for this purpose in particular be combined with the further data in a more comprehensive data format, for example the material exchange format (MXF). Provision may furthermore be made that the calculated spatial light distribution may be transmitted directly to an external device via an interface.

In some embodiments, the optical component may have a coupling section via which the optical component is releasably fastenable to the spotlight. This makes it possible to use the optical component flexibly as an interchangeable optics with different spotlights and, for example, to also provide it as a rental device, wherein the respective spatial light distribution that may be produced may be able to be called up at any time and for any spotlight by the information stored in the memory.

In some embodiments, an article number, a serial number, a half-scatter angle, and/or a luminosity value of the optical component may be stored in the memory. These data may consequently also be provided.

The embodiments and applications of the optical component mentioned above in connection with the spotlight system are also possible for the optical component claimed in isolation.

Furthermore, in accordance with a further aspect, the invention also generally relates to an optical component for a spotlight for illuminating a film or stage environment, wherein the optical component is configured to be coupled to a spotlight configured to generate light, wherein the optical component has a memory in which an article number, a serial number, a half-scatter angle, and/or a luminosity value of the optical component is/are stored. In this respect, the readable memory consequently does not necessarily serve to store information on the spatial light distribution that may be produced by the optical component, but it may alternatively or additionally also record and reproduce other information. This may in particular prove to be advantageous with optical components used as interchangeable optics for a spotlight to be able to provide data on a respective coupled optical component. The embodiments and applications of the optical component mentioned above in connection with the spotlight system (e.g. an embodiment of the memory and of the interface) are generally also possible for such an optical component.

In accordance with a further aspect, the invention further relates to a spotlight for generating light for illuminating a film or stage environment, said spotlight comprising a coupling device by means of which at least one replaceable optical component for producing at least one spatial light distribution is couplable to the spotlight; and a reading device that is configured to read information on the spatial light distribution producible by the optical component from a memory of the coupled optical component.

Such a spotlight may make it possible to determine a spatial light distribution producible by a couplable optical component on the basis of the information stored in the memory of the optical component, in particular by reading from the memory via the reading device, so that the determined light distribution may be taken into account in further steps of a film recording or film processing. Thus, the spotlight may, for example, be equipped with a calculation device to which the information stored in the memory of the optical component may be provided and which may be configured to determine the respective producible spatial light distribution for a plurality of optical components, which are selectively couplable to the spotlight, on the basis of the transmitted information. The reading device may, for example, comprise an electrical plug; an electrical socket; or a radio receiver, in particular together with an associated controller for controlling the communication or for signal conversion.

In this respect, provision may be made that the spotlight has an interface that is configured to output the information read or values derived therefrom. The information read or values derived therefrom, for example a result of a calculation, may thus be output to the outside or to external devices.

In some embodiments, the spotlight, as already mentioned, may have a calculation device that is configured to at least approximately determine the producible spatial light distribution on the basis of the information read. For example, the information may comprise a calculation rule by means of which the calculation device may perform a calculation. The approximation described above, for example comprising polynomial interpolations, may in particular be used in this respect.

Furthermore, the calculation device may be configured to determine the producible spatial light distribution whilst taking into account a settable value of at least one light setting parameter of the spotlight, in particular a brightness value or a color value. Accordingly, in addition to the coupled optical component, the influence of a setting of the spotlight on the producible spatial light distribution may also be taken into account in the determination.

The spotlight may have a lighting device. In some embodiments, the spotlight or its lighting device may have a plurality of illuminants, in particular a plurality of light-emitting diodes, wherein an activation state may be settable for each illuminant and/or a common activation state may be settable for a group of illuminants; wherein the settable activation state of each illuminant may comprise a switched-on state, a switched-off state, a switched-on state with a selected brightness, and/or a switched-on state with a selected emission spectrum; and wherein the calculation device may be configured to determine the producible spatial light distribution in dependence on the set activation states of the illuminants. Light that is variable by the spotlight itself may in particular already be generated by such a plurality of illuminants, whereby the spatial light distribution that may be produced may correspondingly also be influenced on a coupling of an optical component to the spotlight. Consequently, the taking into account of the set activation states of the illuminants may make it possible to obtain data that are as accurate as possible on the spatial light distribution that is produced or that may be produced for spotlights of such a flexibly settable type.

The calculation device may furthermore be configured to determine the producible spatial light distribution whilst taking into account a settable value of at least one optics setting parameter of the coupled optical component. For this purpose, the spotlight may, for example, have a sensor by means of which the value of an optics setting parameter of the coupled optical component may be determined. For example, by means of such a sensor, the spacing of a (stepped) lens or of a reflector from the illuminants of the spotlight may be measured and a respective half-scatter angle of the coupled optics may be determined therefrom so that this half-scatter angle or the measured spacing may be taken into account as an optics setting parameter in the determination of the producible spatial light distribution.

The embodiments and applications of the spotlight mentioned in connection with the spotlight system are generally also possible for the spotlight claimed above in isolation.

In accordance with a further aspect, the invention also relates to a spotlight for generating light for illuminating a film or stage environment, said spotlight comprising a coupling device by means of which at least one replaceable optical component for producing at least one spatial light distribution may be coupled to the spotlight; and a memory in which information on the spatial light distribution producible by the optical component is stored.

Respective information on the producible spatial light distributions may in particular be stored in the memory for a plurality of couplable optical components. In this respect, a respective coupled optical component may be identifiable so that the information associated with the coupled optical component may be read to determine the spatial light distribution.

For this purpose, the spotlight may, for example, have a detection device that is configured to identify the coupled optical component. Such an automatic identification may make it possible to select a piece of information on the producible spatial light distribution from the memory that is associated with the respective coupled optical component. For this purpose, the optical component may, for example, be provided with a coding that may be automatically readable by the detection device on a coupling of the optical component to the spotlight. Alternatively or additionally, such a spotlight may have a selection device by means of which a user may select the respective coupled optical component. A reading of the information associated with this optical component from the memory may thereby also be made possible.

The embodiments and applications mentioned in connection with the spotlight system and in connection with the spotlight comprising a reading device are generally also possible for such a spotlight having a memory.

Furthermore, in accordance with a further aspect, the invention relates to a spotlight for generating light for illuminating a film or stage environment, said spotlight comprising an integrated optical component for producing at least one spatial light distribution; and a memory in which information on the spatial light distribution producible by the optical component is stored. In this respect, the optical component is permanently integrated in the spotlight or fastened thereto. Even in the case of such a spotlight, without interchangeable optics or a selectively couplable or releasable optical component, the spatial light distribution producible by the optical component may thus be determined on the basis of the stored information and data on the spatial light distribution may be provided.

In this respect, the stored information may represent a spatial brightness distribution and/or a spatial color distribution or spatial spectral distribution producible by the optical component.

The spotlight may furthermore have an interface that is configured to output the stored information or values derived therefrom. Consequently, a light data set may be output from the spotlight via such an interface.

Provision may generally be made that the spatial light distribution producible by the optical component of the spotlight is permanently defined, apart from any settings of the spotlight such as its brightness or color. Alternatively, provision may be made in some embodiments that the spatial light distribution producible by the optical component may be varied by setting at least one optics setting parameter. In this respect, the stored information may comprise a calculation rule for determining the producible spatial light distribution in dependence on the set value of the optics setting parameter. Thus, such a spotlight comprising an integrated optical component may also be provided to intentionally produce different spatial light distributions and as desired and, for example, to switch between a spot setting and a flood setting. The stored information or calculation rule may in this respect make it possible to determine, in each of these selectable settings, the spatial light distribution that is or may actually be produced for such a spotlight comprising an integrated optical component.

In some embodiments, the spotlight may have a calculation device that is connected to the memory and that is configured to determine the producible spatial light distribution on the basis of the information stored in the memory.

In this respect, the information may in particular comprise a calculation rule for calculating the spatial light distribution, for example based on a physical model.

Furthermore, in some embodiments, the calculation device may be configured to determine the producible spatial light distribution whilst taking into account a value of at least one settable parameter of the spotlight, in particular whilst taking into account a value of an optics setting parameter of the optical component and/or a value of a light setting parameter of the spotlight such as a brightness setting and/or a color setting. The spotlight may in particular have a lighting device, wherein its brightness setting and/or color setting may be taken into account by the calculation device. Furthermore, the calculation device may be configured to take a variable half-scatter angle of the optical component into account in the determination, for example. For this purpose, the information may, for example, comprise a calculation rule or an approximation of the spatial light distribution that may be produced in dependence on the parameters to be taken into account.

The spotlight may have a lighting device that may particular comprise a plurality of illuminants. The spotlight may in particular have a controllable lighting device. The lighting device may in this respect in particular have a plurality of illuminants, in particular a plurality of light-emitting diodes. Its setting or activation state may also be taken into account in the determination of the spatial light distribution.

The embodiments and applications of the spotlight mentioned in connection with the spotlight system and the embodiments and applications of the optical component mentioned in connection with the spotlight system are generally also possible for the spotlight comprising an integrated optical component.

In accordance with a further aspect, the invention relates to a method of determining a spatial light distribution of a spotlight system that comprises a spotlight for generating light for illuminating a film or stage environment; and an optical component for producing at least one spatial light distribution—in particular as disclosed herein—, wherein the spatial light distribution depends on a set value of at least one setting parameter of the spotlight system, wherein the set value of the at least one setting parameter is determined, and wherein an approximation of the spatial light distribution producible at the set value of the setting parameter is determined by means of a calculation rule and/or a look-up table.

In this method, the optical component may be replaceable or integrated in the spotlight, as explained above for respective different embodiments; in both cases, reference will now be made to a "spotlight system" in simplified terms.

In this respect, the determination of the value of the setting parameter may, for example, comprise reading from a sensor, from a signal input, or from a memory. In principle, this determination may, however, also take place by a recognition of a value set in a simulation program for simulating a producible spatial light distribution or of a value set by means of a control device of the spotlight or of the optical component.

An approximation of the real spatial light distribution that is produced or may be produced may thus be determined by means of this method. Such an approximation may, for example, take place by a calculation, wherein the accuracy of the approximation may, for example, depend on the calculation rule used or any parameter values used. Furthermore, a spatial light distribution read directly from a look-up table is also to be understood as an approximation at least to the extent that such a table may, for example, comprise discrete points in a space with which a portion of the light distribution is associated. Such a look-up table may generally be suitable for reproducing the real spatial light distribution in a predefined binning (i.e. in a predefined discrete value distribution) by which an approximation of the essentially continuous real spatial light distribution takes place.

Such a look-up table may, for example, have been created and stored based on a measurement of the spatial light distribution that may be produced by means of the optical component in a calibration step preceding the method claimed herein. A determination of the approximation by means of a calculation rule may in particular be provided for determining a respective spatial light distribution of spatial light distributions that may be dynamically varied in dependence on a setting parameter in order to enable a so-called morphing between these light distributions. In this respect, the calculation rule may be based on a plurality of reference light distributions, for example measured reference light distributions, and may enable a morphing between such reference light distributions to approximate the spatial light distribution for values of the setting parameter between reference values associated with the reference light distributions. Thus, data on the producible spatial light distribution may be determined at any desired values of the setting parameter.

The approximation or the result of the approximation may be transmitted to an external device, for example a central data collection device, or may be stored at such a device. The approximation may in this respect in particular be transmitted in an EULUMDAT format or a similar format or the approximation may be transmitted in a more comprehensive data format such as the material exchange format (MXF) with further light data in a common data set. The light data obtained may accordingly be further processed or considered in further processing steps in the course of a film recording.

The spatial light distribution may in turn represent a spatial brightness distribution and/or a spatial color or spectral distribution.

In some embodiments, the at least one setting parameter may comprise an optics setting parameter of the optical component, in particular a half-scatter angle of the optical component, and/or the at least one setting parameter may comprise a light setting parameter of the spotlight or of a lighting device of the spotlight, in particular an activation state of a lighting device of the spotlight, a brightness setting of the spotlight, and/or a color setting of the spotlight. A calculation rule may in particular enable a morphing between the light distributions for different values of such setting parameters.

Again, the setting parameter may also comprise an optics setting parameter that directly relates to a setting of the optical component and, for example, to a spacing of two lenses from one another or of at least one optical element such as a lens or a reflector from a lighting device of the spotlight. Characteristic angles of the optical component, for example a half-scatter angle and/or a one-tenth scatter angle and/or a beam angle, may be determined or able to be determined by such an optics setting parameter, in particular a spacing value, so that a dependence of the spatial light distribution on such characteristic angles may hereby also be reproduced. Furthermore, one or more characteristic angle(s) may be calculated in addition to the approximation of the spatial light distribution at a specific setting of the optical component and may be output in a common data set.

The setting parameter may furthermore comprise an identification of a coupled replaceable optical component. A respective coupled optical component may thereby be identified from a plurality of couplable optical components and an approximation of the spatial light distribution that may be produced by means of this coupled optical component may be determined. For example, a readable memory may for this purpose comprise a respective look-up table for a plurality of or for each of the couplable optical components.

In some embodiments, the determination of the approximation of the spatial light distribution by means of the calculation rule may comprise only additions, subtractions, and/or multiplications. Consequently, such a calculation rule (in contrast to a division, for instance) may enable a very simple determination of the approximation so that the necessary calculation steps may be carried out quickly and the approximation may be provided in real time.

In some embodiments, the look-up table may comprise a plurality of approximations for reference light distributions at a plurality of respective reference values of the setting parameter. In a preceding calibration step, reference light distributions may in particular be measured at different values of the setting parameter that may thereupon be stored in tabular form and may finally be called up.

In some embodiments, the calculation rule may define a rule for interpolation between a first reference light distribution at a first reference value of the setting parameter and a second reference light distribution at a second reference value of the setting parameter. For example, a plurality of reference light distributions, in particular measured reference light distributions, may be stored with respect to respective reference values of the setting parameter in one or more look-up tables, wherein the calculation rule may describe an interpolation between such reference light distributions. If a setting parameter is set or selected between the reference values, a morphing of the light distribution may thereby take place to determine an approximation of the spatial light distribution producible at the respective value of the setting parameter. In this respect, the calculation rule may in particular define an interpolation between two reference light distributions which is a linear interpolation and which can accordingly be performed in a fast and simple manner and on the basis of which an approximation of the producible spatial light distribution may be determined at a value of the setting parameter between the reference values.

Provision may be made that, in a parameterization step, which is performed before the step of determining the approximation, the calculation rule is determined based on at least a first reference light distribution at a first reference value of the setting parameter and on at least a second reference light distribution at a second reference value of the setting parameter. For example, a first reference light distribution and a second reference light distribution may be measured, wherein the calculation rule comprises respective interpolation rules between the first reference light distribution and the second reference light distribution in dependence on the value of the setting parameter. Polynomial interpolations for a plurality of spatial points may in this respect in particular be determined that enable a morphing of the spatial light distribution between such reference light distributions. The parameters of such polynomial interpolations (interpolation parameters) may in this respect be stored and used in the calculation step so that a respective spatial light distribution may be determined by inserting the value of the setting parameter into the polynomial interpolations.

Provision may be made that, in the parameterization step, a respective polynomial interpolation is performed for a plurality of predefined or predefinable spatial points in order to parameterize the light incident on the respective spatial point in dependence on the set value of the setting parameter, wherein interpolation parameters of the respective polynomial interpolations may be determined on the basis of the reference light distributions, and wherein the calculation rule may comprise the respective polynomial interpolations for the plurality of spatial points.

In some embodiments, in the parameterization step, the reference light distributions may be divided into a plurality of wavelength ranges and a respective polynomial interpolation may be performed for a plurality of predefined or predefinable spatial points for each of the wavelength ranges in order to parameterize the light incident on the respective spatial point in dependence on the set value of the setting parameter, wherein interpolation parameters of the respective polynomial interpolations may be determined on the basis of the reference light distributions, and wherein the calculation rule comprises the respective polynomial interpolations for the plurality of spatial points. Accordingly, a respective polynomial interpolation may be performed for each of the wavelength ranges at each of the plurality of spatial points so that an approximation of the spatial color distribution or spatial spectral distribution may be determined on the basis of the polynomial interpolations.

In some embodiments, the parameters of the polynomial interpolations and the respective spatial points may be stored in a memory. The memory may in this respect in particular be part of the optical component or part of the spotlight. In the step of determining the approximation, this memory may be accessed and the approximation of the spatial light distribution at a specific value of the setting parameter may, for example, be determined through insertion into the polynomial interpolations.

The method may generally be performed in the spotlight, in the optical component, or outside. The determination of the approximation may in particular, for example, take place by a light control app or light planning app of a mobile device or smartphone.

The method steps mentioned in connection with the spotlight system in accordance with the invention are generally also possible for the method described above for determining a spatial light distribution of a spotlight system.

In accordance with a further aspect, the invention further relates to a computer program product that comprises commands that, on execution by a computer, cause it to perform the method described above.

The invention will be explained in the following purely by way of example with reference to embodiments and to the drawings.

Figure 3:
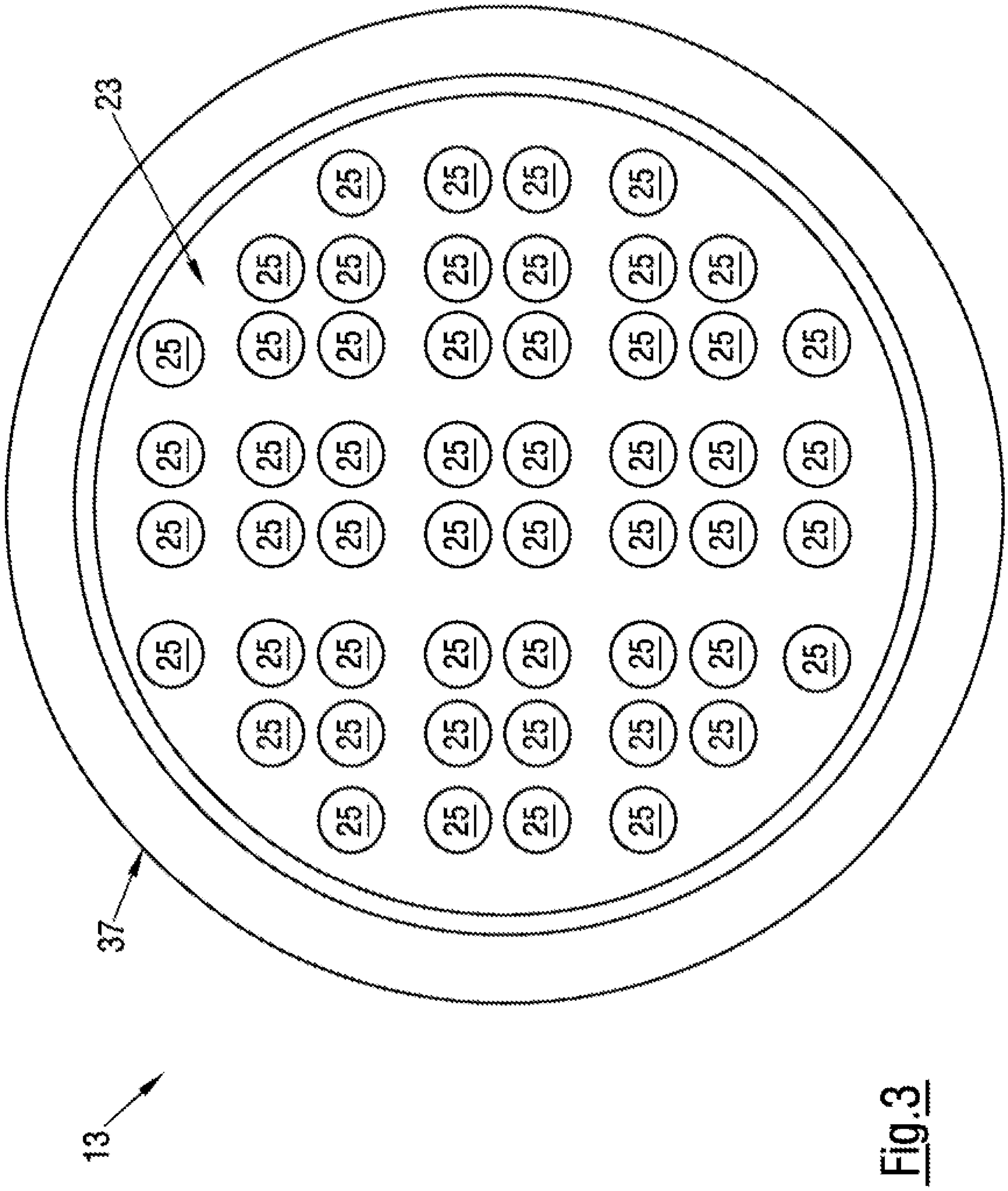
Figure 4:
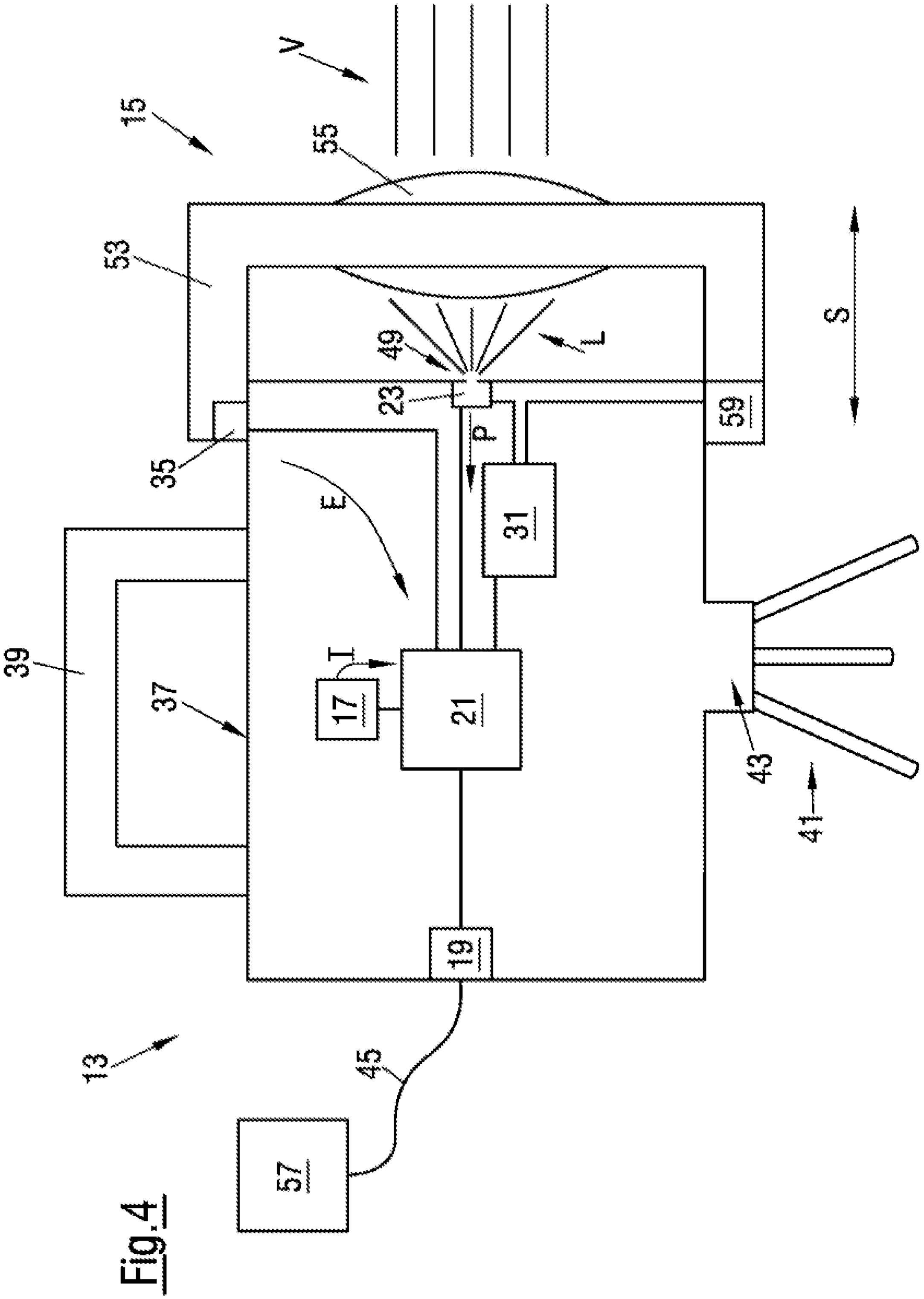
Figure 5:
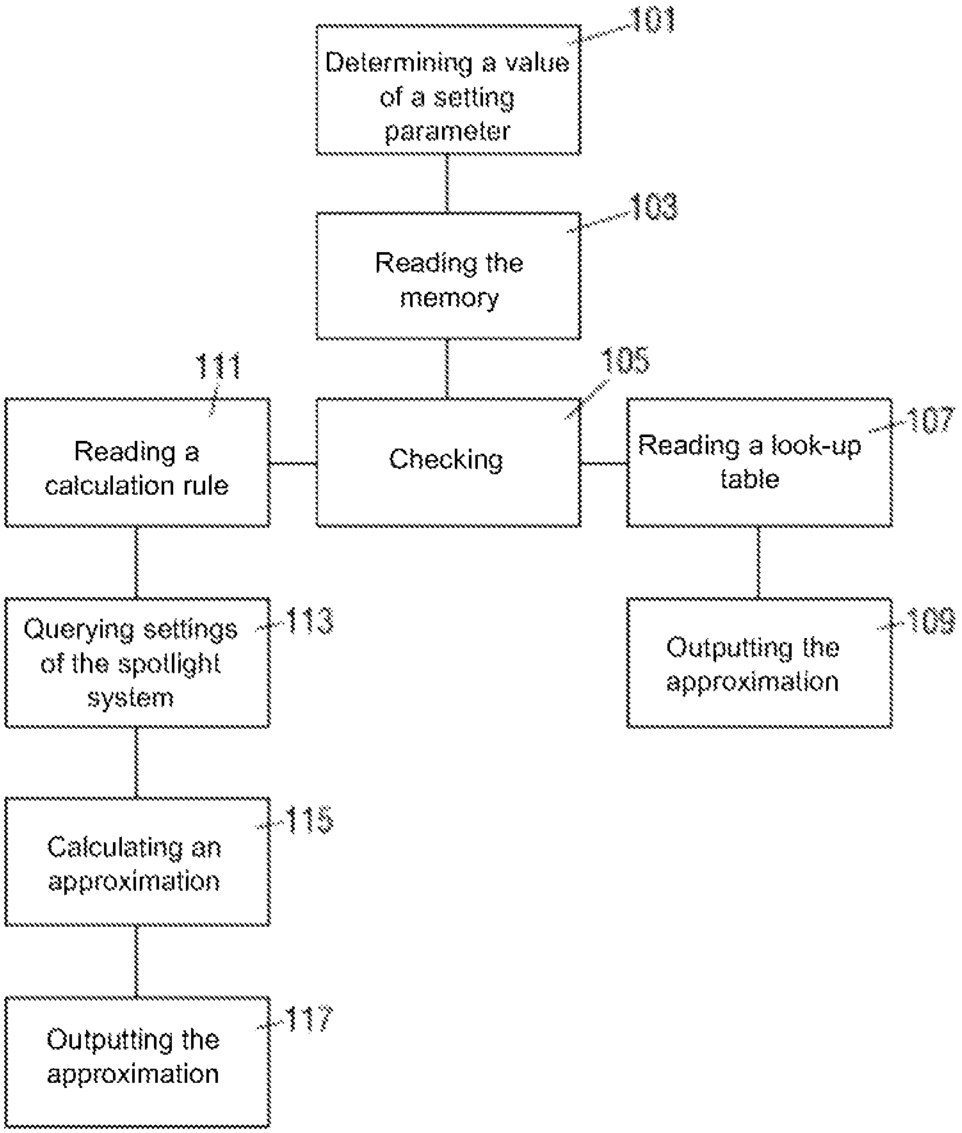
Figure 6:
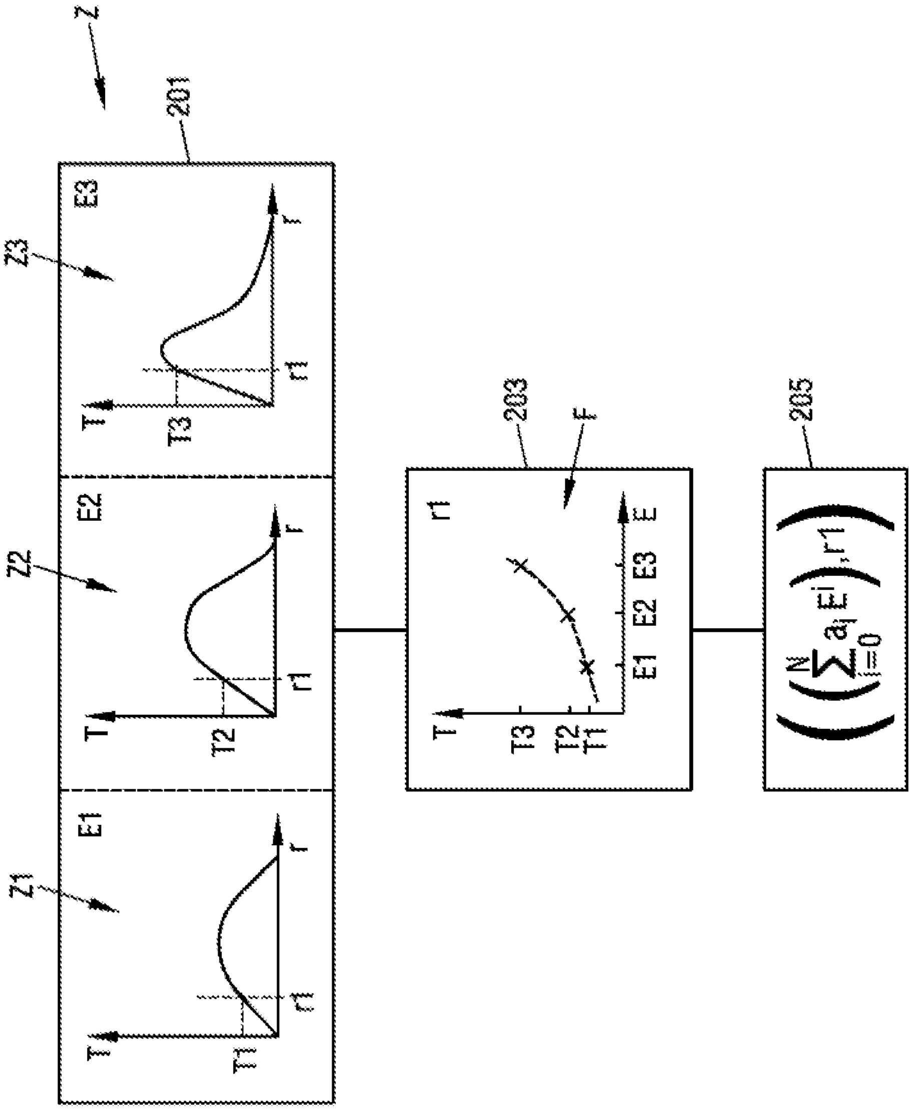

There are shown:

FIGS. 1A to 1G a front view of a spotlight system comprising a spotlight and an optical component, a side view of the spotlight system, a perspective view of the spotlight system with the optical component released from the spotlight, a perspective front view and a perspective rear view of the optical component, and a perspective front view and a perspective rear view of a further optical component couplable to the spotlight;

FIGS. 2A to 2D respective schematic representations of a spotlight system comprising a spotlight for generating light and an optical component couplable to the spotlight for producing a spatial light distribution;

FIG. 3 a schematic front view of the spotlight or its lighting device;

FIG. 4 a schematic representation of a spotlight comprising an integrated optical component;

FIG. 5 a schematic representation for illustrating a method of determining an approximation of a spatial light distribution of a spotlight system in dependence on a variable setting parameter; and FIG. 6 a schematic representation for illustrating a determination of a calculation rule with polynomial interpolations for determining an approximation of a spatial light distribution of a spotlight system in dependence on a variable setting parameter.

Figure 1B:
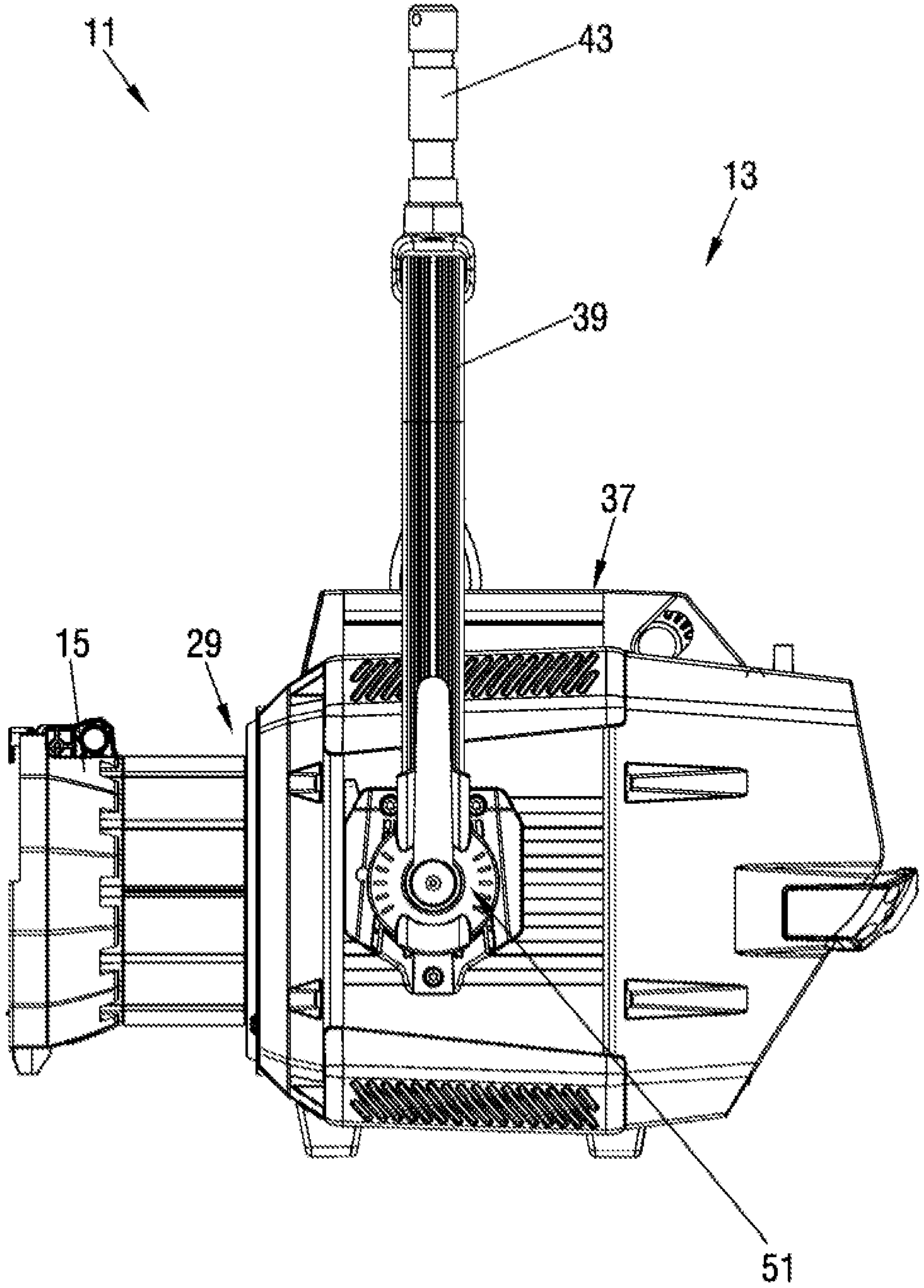

FIGS. 1A and 1B show a spotlight system 11 comprising a spotlight 13 and an optical component 15 releasably fastened thereto. The spotlight 13 has a holding section 43 via which the spotlight 13 may in particular be fastened to a ceiling, to a wall, to a scaffold, or to a tripod 41. The spotlight 13 further comprises a spotlight body 37, which is also designated as a tube, and a lighting device 23 that is configured to generate light L and to transmit the light L through a light exit opening 49 (cf. also FIGS. 2A to 2D, FIG. 3 and FIG. 4).

To be able to set the direction of the light L transmitted by the spotlight 13 and to be able to focus the light L, for example, onto an object to be illuminated or onto a person to be illuminated, the spotlight body 37 is coupled to the holding section 43 via an alignment device 51 and a handle 39. This alignment device 51 makes it possible to pivot the spotlight 13 about a pivot axis A and to fix it at a desired deflection to be able to set the exit angle of the light L with respect to the horizontal. Furthermore, the spotlight 13 may have an interface 19 with a cable 45 connected thereto via which the spotlight 13 may, for example, be supplied with power, on the one hand, while this interface 19, in particular in a configuration of the cable 45 or of an additional cable as an Ethernet cable or the like, may also serve to transmit data of the spotlight 13 (in particular device data, operating data, and/or setting data) to the outside (cf. FIGS. 2A to 2D and FIG. 4).

The optical component 15 coupled to the spotlight 13 in FIGS. 1A and 1B is provided to produce a spatial light distribution V from the light L generated by the spotlight 13 (cf. also FIGS. 2A to 2D and FIG. 4). For this purpose, the optical component 15 comprises a reflector 56, wherein such a reflector 56 may in particular be formed in a segmented manner as in the optical component 15 shown in FIGS. 1A to 1D. Furthermore, such optical components 15 may also comprise (stepped) lenses 55 (cf. also FIG. 1F), projection lenses, diffusor lenses, or filters. In this respect, the optical component 15 makes it possible to deflect the light L generated by the spotlight 13 or its lighting device 23 in accordance with a geometric and/or spectral light shaping characteristic and to produce a desired spatial light distribution V on an area.

For example, with the aid of such an optical component 15, the light L may be cast in a bundled manner onto an area in a relatively narrow circle or in an ellipse in order, in such a spot setting, to light a specific region of a scene to be recorded and to set it apart from the surroundings, whereas provision may alternatively, for example, be made in a flood setting to produce such a spatial light distribution V by means of an optical component 15 that as large as possible an area is irradiated uniformly and with soft transitions to the non-illuminated surroundings.

Figure 1C:
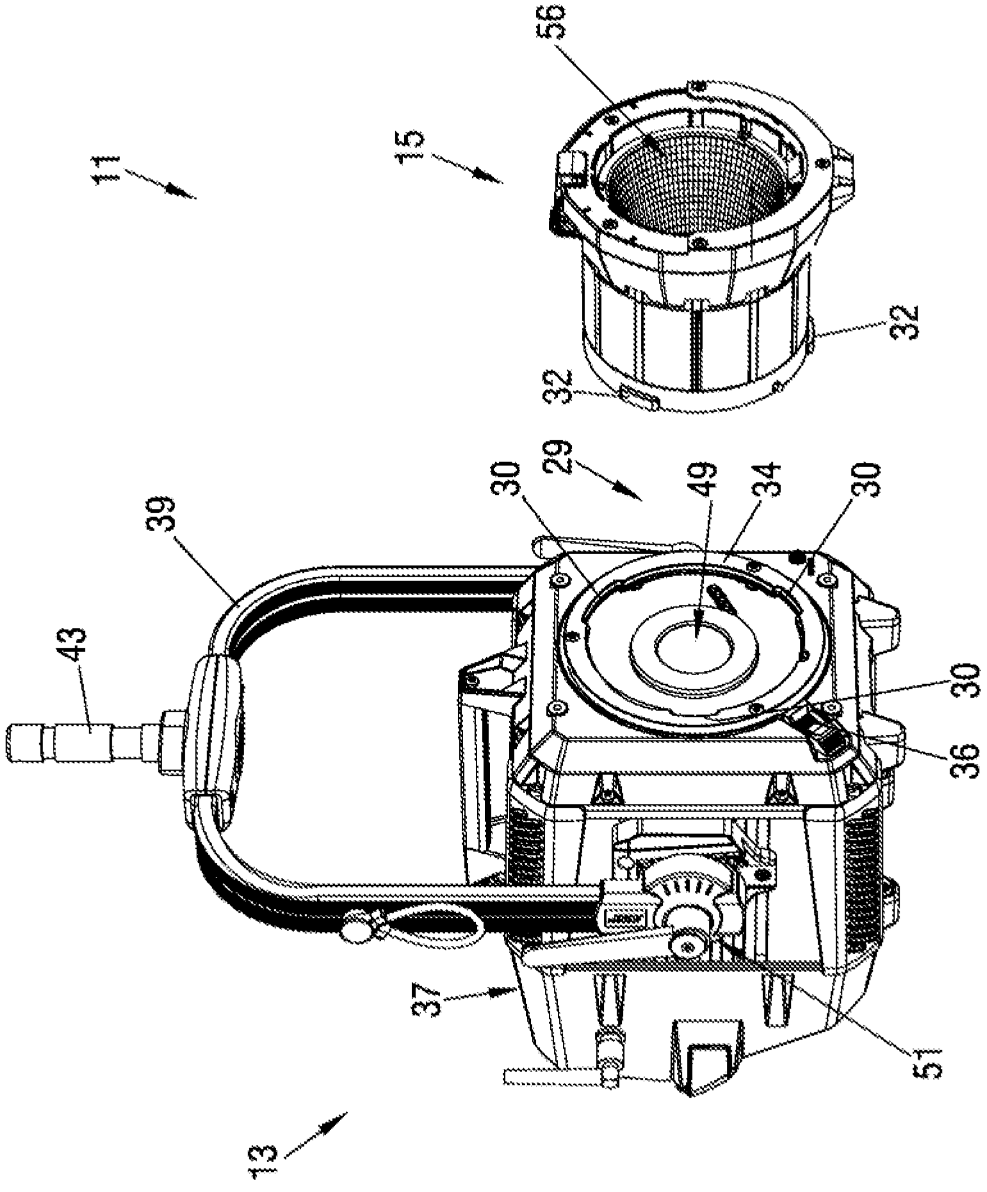

As FIG. 1C shows, the optical component 15 is releasable from the spotlight 13 and is consequently configured as an interchangeable optics. Due to the possibility of releasably fastening optical components 15 to the spotlight 13, different optical components 15 or 15*a* may selectively be coupled to the spotlight 13 to be able to obtain a respective spatial light distribution V, which is ideally adapted to specific requirements, from the light L generated by the spotlight 13. The optical components 15 and a further optical component 15*a* are illustrated in more detail by way of example here in FIGS. 1D to 1G.

To be able to selectively connect the optical components 15 for producing a spatial light distribution V and 15*a* to the spotlight 13, the spotlight 13 has a coupling device 29 having a plurality of coupling elements 30 at a front side at which the light L exits through the light exit opening 49. These coupling elements 30 are formed as recesses in a ring 34 here into which corresponding web-like coupling elements 32 of the optical components 15 and 15*a* may be inserted. The coupling elements 32 of the optical component 15 or 15*a* may be secured to the spotlight 13 by the ring 34 by a subsequent rotation of the optical component 15 or 15*a* to be coupled so that the optical components 15 and 15*a* may be coupled very quickly to the spotlight 13 by this plug-in rotary connection in order to produce a desired spatial light distribution V. To securely fix the respective coupled optical component 15 or 15*a* to the spotlight 13 and so-to-say to enable a fast and uncomplicated release of the optical component 15 or 15*a*, for example to change the coupled optical component 15 or 15*a*, the spotlight 13 has a release mechanism 36 that is likewise arranged at the front side. Said spotlight 13 may, for example, be actuable by a pressing or pushing, wherein the coupled optical component 15 or 15*a* may only be released for a rotating back and release from the spotlight 13 as a result of such an actuation and may otherwise be secured to the spotlight 13.

Thus, the coupling device 29 may make it possible to selectively couple one of the optical components 15 and 15*a* or also other optical components 15, not shown and of a different type, to the spotlight 13. In this respect, the optical components 15 may have respective and in particular different light shaping characteristics to be able to produce a desired spatial light distribution V.

Figure 1E:
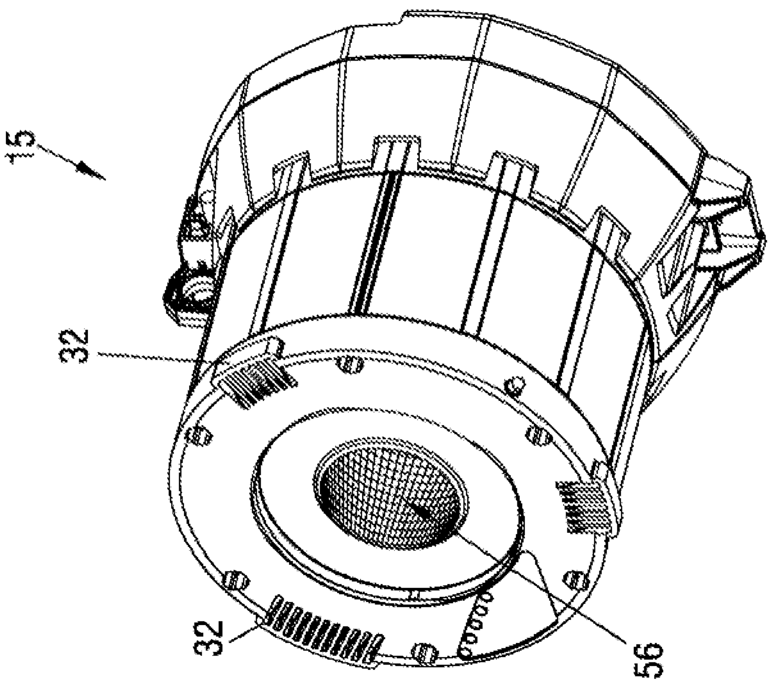
Figure 1D:
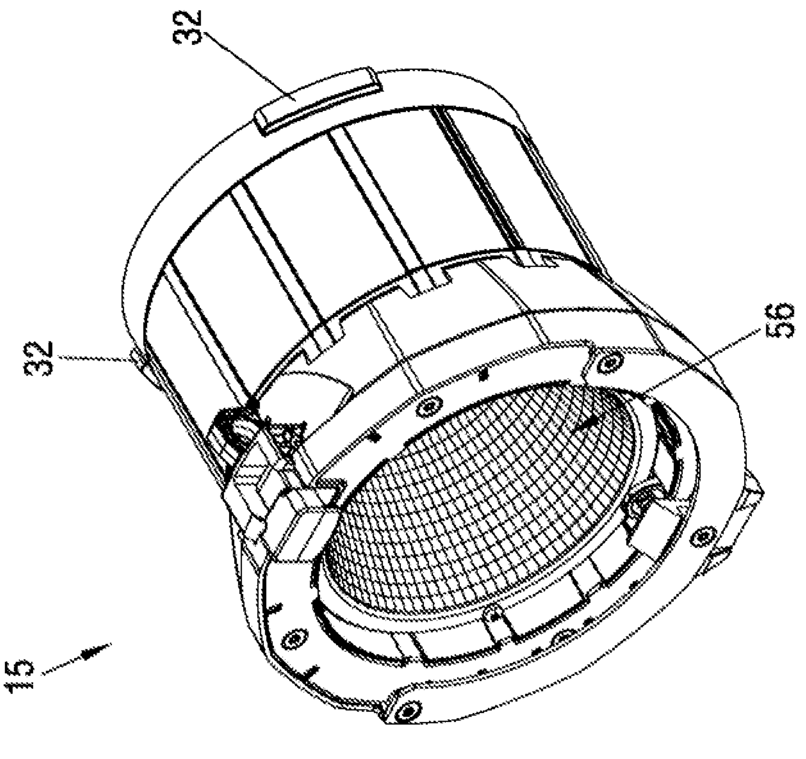

The optical component 15 shown in more detail in FIGS. 1D and 1E (perspective front view and rear view) is formed by way of example with a segmented reflector 56. Alternatively to a fixed-position reflector 56 with an invariable (in particular "soft") light field, provision may be made that the optical component 15 couplable to the spotlight 13 is, for example, movable or extendable with respect to the optical axis, wherein the produced spatial light distribution V may be variable in dependence on this setting of the optical component 15. For example, values of a beam angle of the generated light beam of 15°, 30° and/or 60° may be settable by such a setting. An optical component 15 formed in this manner comprising a reflector 56 may in particular be used to irradiate objects that are relatively far away with a brightness that decreases continuously toward the edges of the lit area.

Figure 1G:
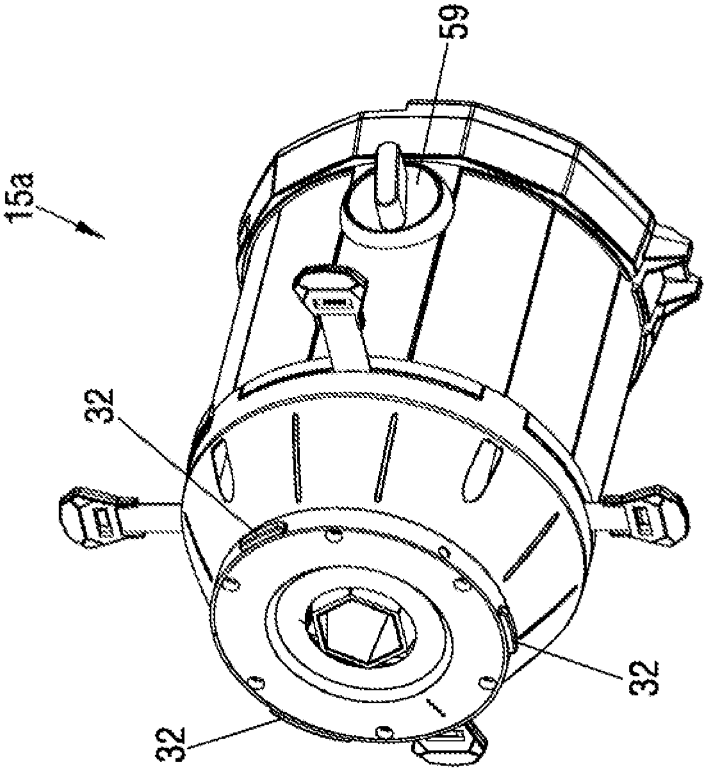
Figure 1F:
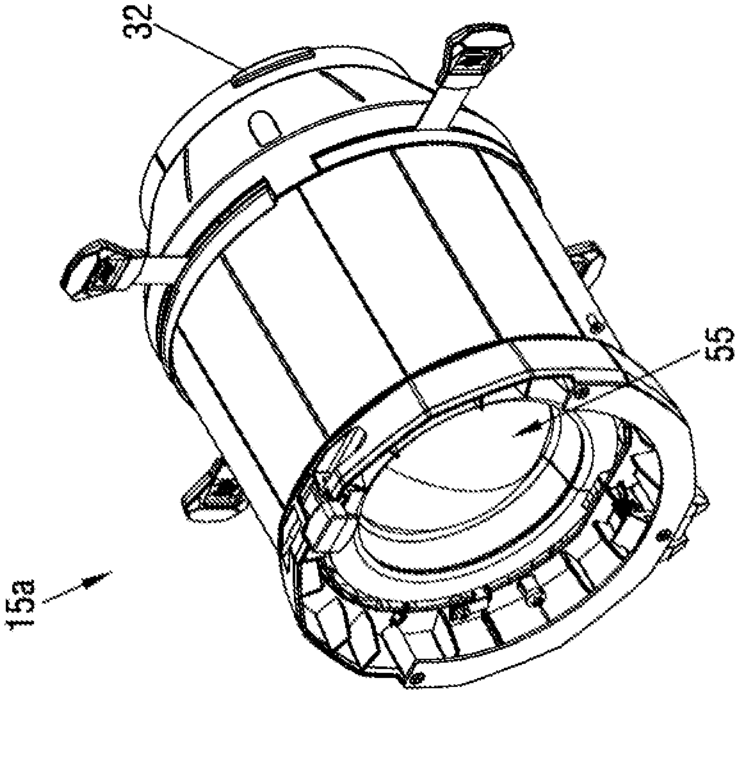

Alternatively to a design with a reflector 56, the optical component 15*a* shown in FIGS. 1F and 1G (perspective front view and rear view) has a lens 55, in order, for example, to be able to illuminate a region to be illuminated as uniformly as possible with respect to brightness and color. In this respect, the optical component 15*a* is settable so that, for example, a beam angle or a half-scatter angle of the optical component 15*a* may be adapted. For this purpose, an adjustment device 59 in the form of a rotary knob is provided at an outer side of the optical component 15*a*, by means of which rotary knob the spacing of the lens 55 from the light exit opening 49 may, for example, be variable. The optical component 15*a* may in particular also have further lenses not visible in FIGS. 1F and 1G and two lenses arranged at a fixed spacing from one another may, for example, be displaceable together by actuating the adjustment device 59 in order to adapt the spatial light distribution V that may be produced by the optical component 15*a*. Provision may furthermore be made to adapt the radiation characteristic of the optical component 15*a* by changing the spacing of a plurality of lenses, and in particular of two lenses, for which purpose one of these lenses may, for example, be movable by means of the adjustment device 59. Beam angles of 15°, 25°, and/or 35° may in particular be settable in such an optical component 15*a*.

Consequently, such a settability of the optical components 15 and 15*a* couplable to the spotlight 13 makes it possible to be able to adapt the produced spatial light distribution V without having to change the optical component 15. In a corresponding manner, alternatively to the spotlight system 11 shown here comprising interchangeable optics, provision may also be made to form a spotlight 13 comprising an integrated optical component 15. In this respect, the optical component 15 may be settable to be able to flexibly adapt the spatial light distribution V that may be produced, whereas it is also possible to form a spotlight 13 comprising an integrated and fixed optical component 15 so that the producible spatial light distribution V is defined.

Due to the influence of a lighting or of the light conditions on a scene to be recorded or on a recorded scene, there is a need to be able to take into account data on the spatial light distribution V produced by an optical component 15 in conjunction with a spotlight 13, for example in postproduction, in order to expand the possibilities for the postprocessing of a scene, for example. Furthermore, it may be desired to perform a simulation of the light conditions on the basis of such data already before the recording of a scene in order to be able to find ideal settings and to apply them directly at the start of a shoot.

To enable this, a spotlight system 11 described in the following with reference to FIGS. 2A to 2D, comprising a spotlight 13 and an optical component 15 couplable to the spotlight 13, and a spotlight 13 illustrated in FIG. 4 comprising an integrated optical component 15 are configured to determine and output data on the spatial light distribution V producible by the respective optical component 15.

Figure 2A:
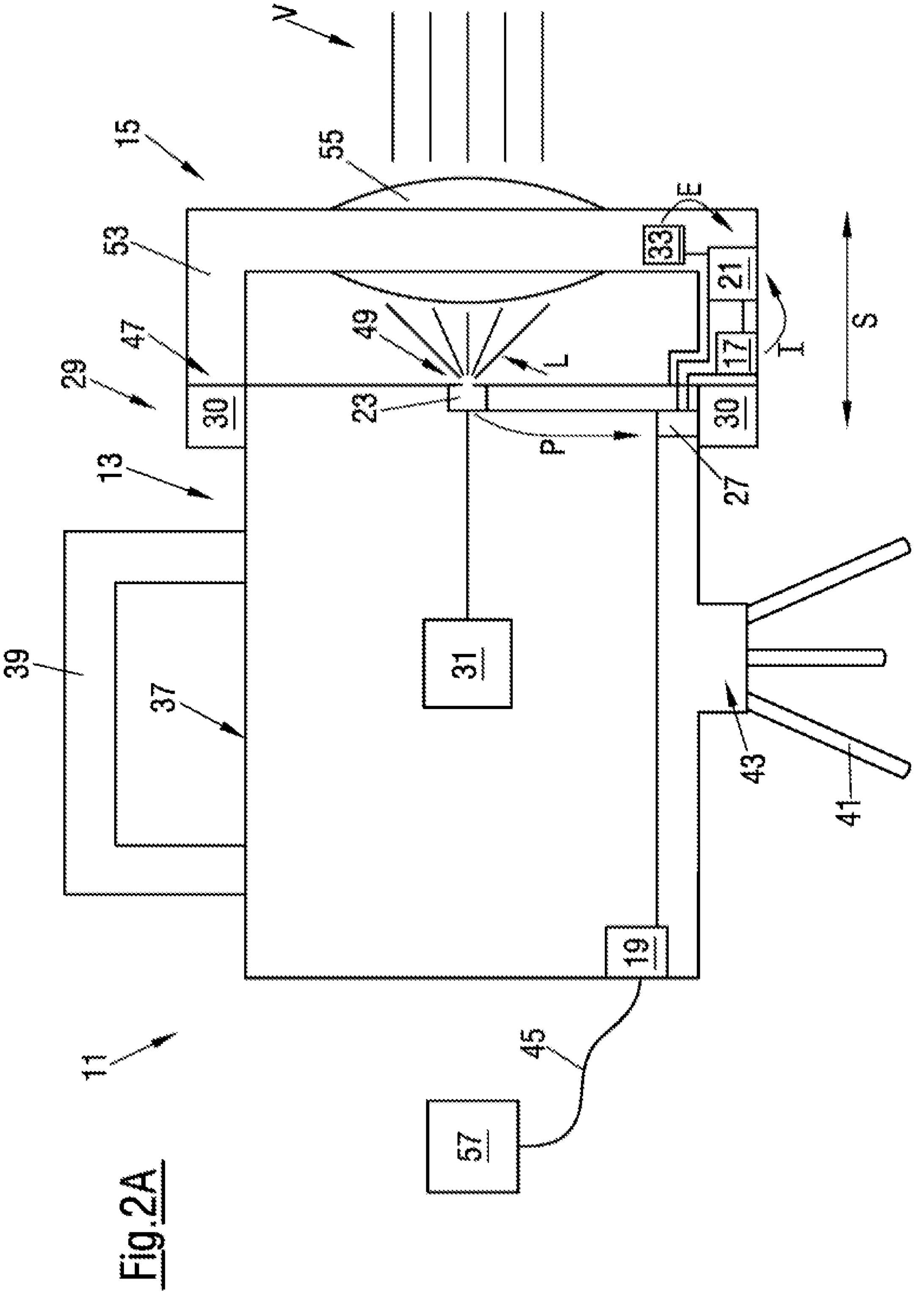
Figure 2B:
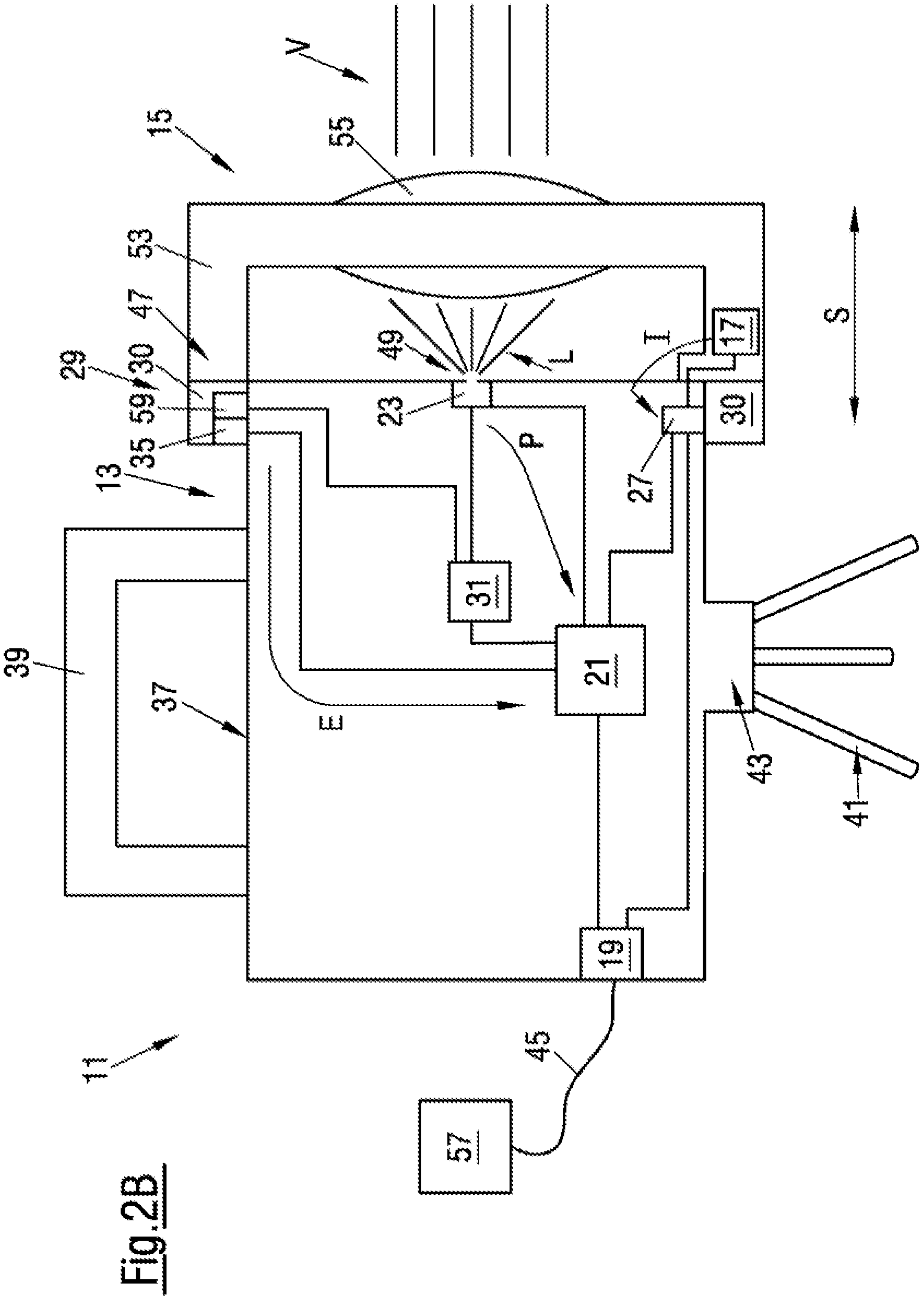

The spotlight system 11 schematically shown in FIG. 2A comprises a spotlight 13 to which an optical component 15 is releasably coupled. In this respect, the spotlight 13 has a coupling device 29 having coupling elements 30 via which a coupling section 47, formed at a support body 53, of the optical component 15 is coupled to the spotlight 13. For this purpose, a plug-in connection, a rotary connection, a rotary plug-in connection or a sliding connection, and in particular a form fit or a force fit, may be present between the coupling elements 30 and the coupling section 47.

Due to this releasable connection of the optical component 15 to the spotlight 13 via the coupling device 29, a plurality of different optical components 15, which may correspondingly be configured as interchangeable optics, may be flexibly coupled to the spotlight 13. The spotlight 13 is furthermore formed with a handle 39 so that the spotlight system 11 may be transported in a simple manner and may be positioned at a provided location by means of the tripod 41.

The optical component 15 here has a lens 55 that is configured as a converging lens and that forms a spatial light distribution V from the light L generated by a lighting device 23 and exiting through a light exit opening 49. In this respect, the lens 55 acts such that light L emitted isotropically by the lighting device 23 is irradiated as a substantially parallelized radiation in order, for example, to be able radiate an object or a person in a focused manner. However, this design of the optical component 15 with a lens 55 is purely exemplary in this respect and optical components 15 of any desired design for producing any desired spatial light distributions V may generally be couplable to the spotlight 13 as a component of the spotlight system 11.

Furthermore, the optical component 15 has a control device 33 that is configured to move the optical component 15 or at least parts thereof along an adjustment direction S and thereby to vary the spacing between the lens 55 and the light exit opening 49. For example, the control device 33 may for this purpose be connected to an electrically controllable adjustment device (e.g. an electric motor or other actuator, not shown) and may itself be electrically controllable, in particular via a radio connection. Alternatively to the control device 33, a manually actuable adjustment device may be provided. A half-scatter angle may in this respect, for example, be set by this spacing, wherein the spatial light distribution V producible by the optical component 15 may depend on the half-scatter angle or on the set spacing as an optics setting parameter E.

To be able to provide data on the spatial light distribution V producible by the optical component 15, the optical component 15 has a memory 17 in which information I on the spatial light distribution V producible by the optical component 15 is stored. In this respect, the information I may, for example, relate to a spatial brightness distribution and/or to a spatial color or spectral distribution, wherein the information I may, for example, also indicate a parameter of the optical component 15 such as a half-scatter angle or merely an identification of the optical component 15.

The memory 17 is connected to the spotlight 13 via an interface 27, wherein the memory 17 may be automatically connectable to the interface 27 and readable via it on a coupling of the optical component 15 to the spotlight 13. The interface 27 is furthermore connected to an interface 19 to which a cable 45 is connected so that the information I stored in the memory 17 may be transmitted to an external data collection device 57 or the memory 17 may be read by the data collection device 57. In addition to the information I on the producible spatial light distribution V, an article number, a serial number, a half-scatter angle, and/or a luminosity value of the optical component 15 may, for example, also be stored in the memory 17 and may be transmittable to the outside or to the external data collection device 57 in this manner.

As already mentioned above, the spatial light distribution V produced by the optical component 15 may be varied by moving the lens 15 along the adjustment direction S relative to the light exit opening 49. Consequently, the spatial light distribution V producible by the optical component 15 may depend on an optics setting parameter E, for example a half-scatter angle, that may be varied by such a setting.

In order, for such a variably settable optical component 15, to be able to obtain and output data on the respective producible spatial light distribution V in dependence on the set value of the optics setting parameter E, the information I stored in the memory 17 may enable an approximation of the spatial light distribution V in dependence on the set value of the optics setting parameter E. For example, the stored information I may comprise a calculation rule that may comprise at least one respective polynomial interpolation F for a plurality of spatial points r that describes the dependence of a portion T of the producible spatial light distribution V at a respective spatial point r1 on the set value of the optics setting parameter E, as explained in more detail in the following in connection with the method illustrated by FIGS. 5 and 6 of determining an approximation of the producible spatial light distribution V. Furthermore, for a plurality of values E1, E2, E3 of the optics setting parameter E, the memory 17 may comprise a respective look-up table by means of which the spatial light distribution V producible at the respective value E1, E2 or E3 of the optics setting parameter E may be determined (cf. also FIGS. 5 and 6).

To be able to carry out such a determination or calculation of the spatial light distribution V in dependence on the optics setting parameter E, the optical component 15 has a calculation device 21 that is connected to the memory 17 and that may, for example, be configured as a microprocessor. This calculation device 21 is in this respect also connected to the control device 33 of the optical component 15 so that a set or selected value of the optics setting parameter E may be determined and may be taken into account in a determination of the spatial light distribution V or an approximation thereof by the calculation device 21. For this purpose, the control device 33 (or a manually actuated adjustment device provided instead) may, for example, comprise a sensor by means of which the spacing of the lens 55 from the light exit opening 49 may be determined directly or indirectly and may thereby be taken into account as an optics setting parameter E by the calculation device 21. For example, such a sensor may be configured as an absolute or incremental position encoder (sensing an angle of rotation or sensing linearly).

A determination of an approximation of the spatial light distribution V by the calculation device 21 may in particular comprise an insertion of the respective value of the optics setting parameter E into the aforementioned polynomial interpolations F. This may in particular enable a morphing between different spatial light distributions V, in which only additions and subtractions are performed, so that the calculated approximation of the spatial light distribution V may be obtained without a large calculation effort. Furthermore, the information may also comprise other types of calculation rules for determining the approximation by means of which the calculation device 21 determines the approximation. Such calculation rules may, for example, be based on physical models or comprise rules for interpolation between different reference light distributions Z, in particular measured reference light distributions Z. For example, provision may be made to determine an approximation of the producible spatial light distribution V for values of the optics setting parameter E between reference values E1, E2, E3, for which reference light distributions Z1, Z2, Z3 are present, by linear interpolation between adjacent reference light distributions Z1 and Z2 or Z2 and Z3.

The calculation device 21 is also connected via the first interface 27 to the spotlight 13 and via the latter to the interface 19 so that the approximation determined from the information I may be transmitted to the external data collection device 57.

Furthermore, the spotlight 13 also has a control device 31 that is connected to the lighting device 23 and that is configured to control it. As FIG. 3 illustrates, the lighting device 23 of such a spotlight 13 may comprise a plurality of illuminants 25, wherein the illuminants 25 may in particular be configured as light-emitting diodes. The size of the already mentioned light exit opening 49 may be adapted to the size of the lighting device 23 or to the number of illuminants 25. In this respect, the control device 31 may be configured to selectively set a respective activation state of the illuminants 25. For example, such an activation state may comprise a switched-on state of an illuminant 25, a switched-off state, a switched-on state with a selected brightness, and/or a switched-on state with a selected emission spectrum. Such an activation state may furthermore be provided for a respective group of illuminants 25. Accordingly, by controlling the lighting device 23 and, for example, switching on a specific selection of illuminants 25 and switching off the further illuminants 25, the light L leaving the light exit opening 49 may be changed and the spatial light distribution V that may ultimately be produced by the optical component 15 may thus also be influenced. Similarly, brightness or color settings of the spotlight 13 may also be variable by the control of the lighting device 23.

To also be able to take into account the setting of the lighting device 23 in the determination of the spatial light distribution V or to be able to output it as part of a light data set via the interface 19, the lighting device 23 is connected to the interface 27 between the spotlight 13 and the optical component 15. A settable value of a light setting parameter P of the spotlight 13, for example a brightness value or a color value, may thereby be transmitted via the interface 27 and the interface 19 may be transmitted as part of a light data set, for example in EULUMDAT format, to the data collection device 57. Furthermore, the calculation device 21 of the optical component 15 may be configured to take into account the settable value of the light setting parameter P of the spotlight 13 in a determination of the spatial light distribution V, wherein the value of the light setting parameter P may be transmitted to the calculation device 21 via the interface 27. For example, a set brightness or color of the spotlight 13 or of the lighting device 23 may in this way be included as a settable parameter P in the determination, performed by the calculation device 21, of an approximation of the spatial light distribution V producible by the optical component 15.

In the embodiment of a spotlight system 11 illustrated in FIG. 28, the optical component 15 also has a memory 17 in which information I on the spatial light distribution V producible by the optical component 15 is stored and which is connected to the spotlight 13 via an interface 27. Again, the memory 17 of the optical component 15 is connected via the interface 27 to an interface 19 formed at the spotlight 13 so that the data stored in the memory 17 and in particular the information I on the producible spatial light distribution V may be transmitted to the outside. However, this connection is not absolutely necessary if the calculation device 21 explained in the following is provided.

Furthermore, the spotlight 13 here has a calculation device 21 that is connected to the interface 27 and that is configured to determine the spatial light distribution V producible by the optical component 15 or an approximation of this light distribution V on the basis of the information I and in dependence on a value of a variable optics setting parameter E. The calculation device 21 is in this respect connected to a sensor 35 by means of which the value of the optics setting parameter E of the optical component 15 may be determined and may thus be taken into account in the determination of the approximation of the spatial light distribution V. For this purpose, the sensor 35 may, for example, be configured to determine the spacing between the lens 55 and the light exit opening 49, wherein this measure may, for example, be communicated to the calculation device 21 as a respective half-scatter angle corresponding thereto.

The calculation device 21 is furthermore connected to the lighting device 23 so that the calculation device 21 may also take into account respective settable values of a light setting parameter P of the spotlight 13 in the determination. The calculation device 21 is furthermore connected to a control device 31 of the spotlight 13 that is configured to control the lighting device 23. Alternatively or in addition to the direct connection of the calculation device 21 to the lighting device 23 and to the sensor 35, the parameters P and E relating to the spotlight system 11 may, as shown, also be transmitted indirectly via the control device 31 to the calculation device 21.

In this respect, in addition to the lighting device 23, the control device 31 is also connected to an electrically controllable adjustment device 59 that may, for example, be integrated in the coupling device 29, wherein the control device 31 is configured to move the optical component 15 coupled to the spotlight 13 or its lens 55 along the adjustment direction S by means of the adjustment device 59 and thereby to set the optics setting parameter E. Alternatively thereto, an adjustment device that is not shown in FIG. 2B, that is separate from the coupling device 29 and that is manually actuable may generally also be provided (cf. also adjustment device 59 in FIG. 1G), wherein the value of the optics setting parameter E in such embodiments, as mentioned, may be determined by means of the sensor 35, may be transmitted to the calculation device 21, and may thereby be taken into account in the determination of the approximation of the spatial light distribution V.

Again, the calculation device 21 is connected to the interface 19 so that the value of the optics setting parameter E of the optical component 15 and/or the calculation result already determined by the calculation device 21 may be forwarded to the outside and in particular to the external data collection device 57.

Provision may generally also be made that the determination of an approximation of the producible spatial light distribution V is carried out in a plurality of steps and, for example, distributed over respective calculation devices 21 of the optical component 15 and of the spotlight 13. In this respect, a first result of a determination of the calculation device 21 of the optical component 15 may, for example, be transmitted to a calculation device 21 of the spotlight 13, wherein the calculation device 21 of the spotlight 13 ultimately calculates the desired approximation based on the first result.

Figure 2C:
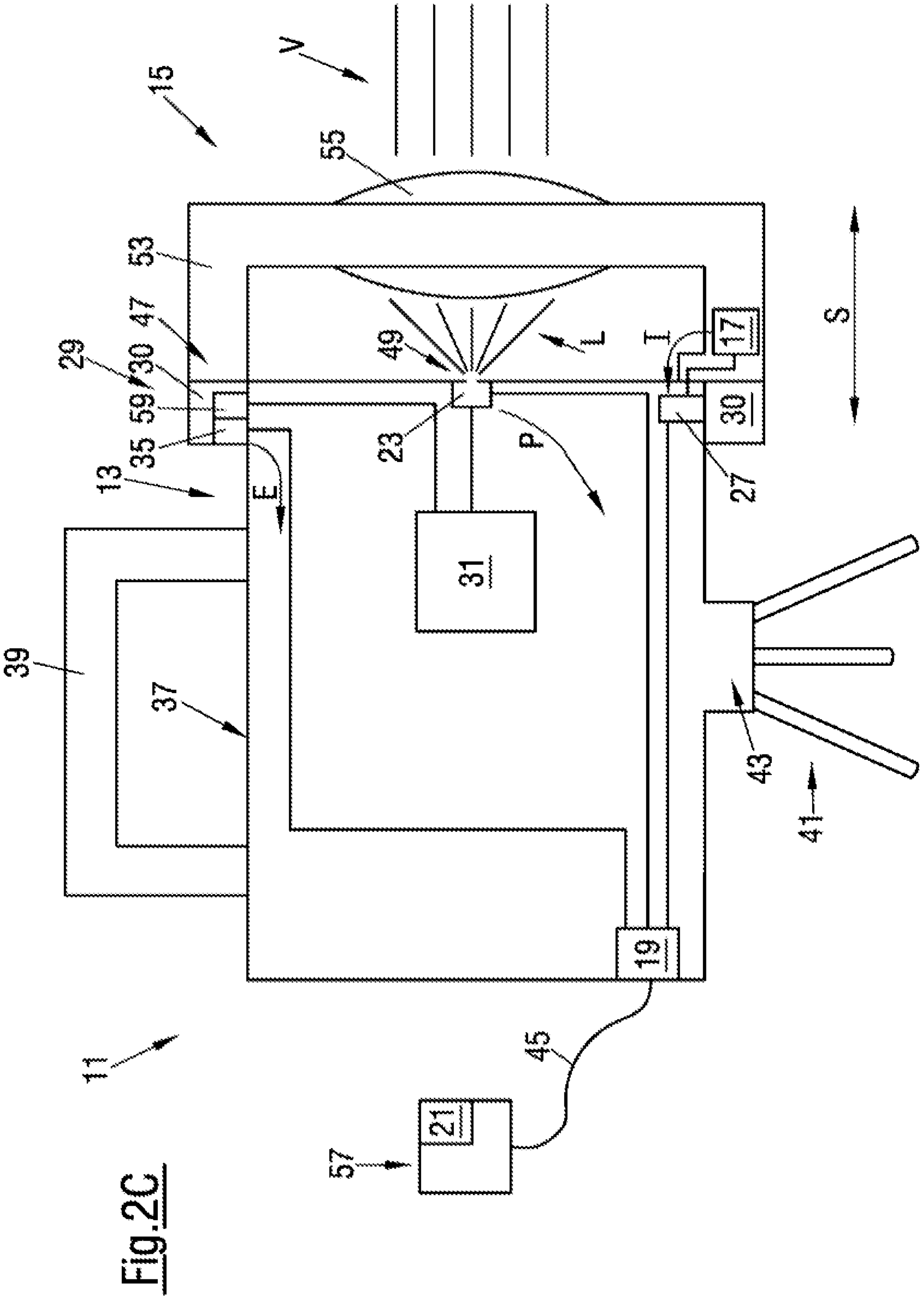

In the exemplary embodiment of a spotlight system 11 illustrated in FIG. 2C, the optical component 15 coupled or couplable to the spotlight 13 also has a memory 17 comprising information I on the spatial light distribution V producible by the optical component 15. This information I and other data stored in the memory 17 may be transmitted to an external data collection device 57 via an interface 27 and an interface 19 and the cable 45. Furthermore, the interface 19 is connected to a sensor 35 for determining a settable optics setting parameter E of the optical component 15 and also any settings of the lighting device 23 or values of a light setting parameter P of the spotlight 13 may be transmitted to the external data collection device 57 via the interface 19.

Furthermore, the data collection device 57 in this respect has a calculation device 21 that is configured to determine the spatial light distribution V producible by the optical component 15 in dependence on the optics setting parameter E and on the settable value of the light setting parameter P of the spotlight 13. Provision may thus be made to only transmit the values of the parameters E and P and other light data from the spotlight system 11 to the external data collection device 57, wherein any calculations are not performed in the spotlight system 11 itself, but rather by external devices. For example, the external data collection device 57 may be configured as a computer that prepares or processes the metadata for postproduction.

In addition to the transmission via a cable 45, provision may generally also be made in all the embodiments that the data is transmitted wirelessly via the interface 19 and/or the interface 27 and via a radio connection, for example. In such a transmission, a determination of the spatial light distribution may in particular also be performed in a light planning app or light evaluation app on a mobile device or smartphone.

Figure 2D:
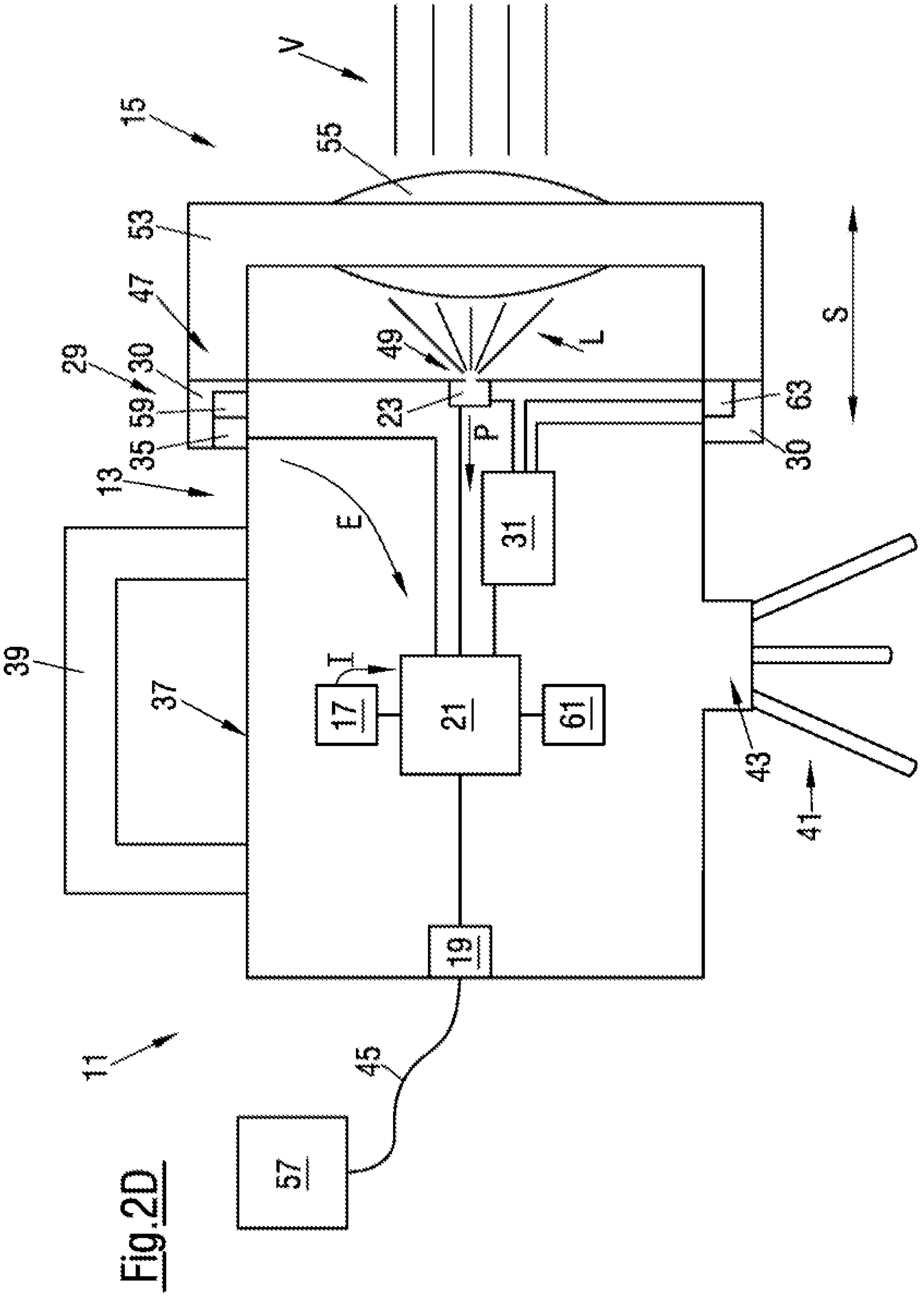

In the spotlight system 11 shown in FIG. 2D, an optical component 15 is provided that is releasably connectable to a spotlight 13 via a coupling device 29, wherein the spotlight 13 has a memory 17 in which information I on the spatial light distribution V producible by the optical component 15 is stored. The spotlight 13 additionally has a calculation device 21 connected to the memory 17 to be able to determine an approximation of the producible spatial light distribution V in dependence on a settable value of an optics setting parameter E of the optical component 15 (if the optics setting parameter E is adjustable) and on a settable value of a light setting parameter P of the spotlight 13 (if the light setting parameter P is settable).

In this respect, the calculation device 21 is connected to a selection device 61 so that a user may, for example, select a respective coupled optical component 15 to make the determination of the spatial light distribution V producible by means of that optical component 15 possible for the calculation device 21. For a plurality of couplable optical components 15, the memory 17 may accordingly comprise information I on the respective spatial light distribution V that may be produced by means of this optical component 15. Furthermore, the spotlight 13 has a detection device 63 that is configured to automatically detect a respective coupled optical component 15 so that this identification, which is necessary for determining the producible spatial light distribution V, may be automatically transmitted to the calculation device 21 via the control device 31 of the spotlight 13 connected to the detection device 63.

In general, as can be seen from the different possible embodiments of the spotlight system 11, the components described together in connection with a spotlight system 11 with reference to FIGS. 2A to 2D, a spotlight 13 and an optical component 15, may thus also separately enable the provision of data on the spatial light distribution V producible by means of the optical component 15. Accordingly, despite their joint description in a spotlight system 11, these components are each also to be understood independently of this spotlight system 11 as separate aspects of the present invention.

In addition to such spotlight systems 11 comprising spotlights 13 and optical components 15 selectively couplable thereto, FIG. 4 shows a spotlight 13 comprising an integrated or fixedly connected optical component 15 for producing a spatial light distribution V. The optical component 15 is in this respect consequently permanently connected to the spotlight 13. The spotlight 13 has a memory 17 in which information I on the producible spatial light distribution V is stored and the memory 17 is connected to a calculation device 21 to be able to determine an approximation of the producible spatial light distribution V in dependence on a variable optics setting parameter E of the optical component 15 and of a settable parameter P of the spotlight 13. To be able to change the producible spatial light distribution V in the case of such an integrated optical component 15, the spotlight 13 has an adjustment device 59 via which the spacing between the lens 55 and the light exit opening 49 may be varied manually or by an electrical control by means of the control device 31 of the spotlight 13.

Furthermore, provision may also be made that a spotlight 13 comprising an integrated optical component 15, whose setting is not variable, has a memory 17 comprising information I on the spatial light distribution V producible by the optical component 15, wherein such a spotlight 13 may, for example, also comprise a calculation device 21 to be able to determine the producible spatial light distribution V in dependence on a settable value of a light setting parameter P of the spotlight 13, for example a brightness value.

FIG. 5 illustrates a method of determining an approximation of a spatial light distribution V of a spotlight system 11 comprising a spotlight 13 and an optical component 15 couplable or coupled thereto, which method may, for example, be performed by the calculation devices 21 of the spotlight systems 11 shown in FIGS. 2A to 2D or by the calculation device 21 of the spotlight 13 illustrated in FIG. 4.

In this respect, in a first step 101, a value of a setting parameter E, P of the spotlight system 11, on which the spatial light distribution V directly or indirectly depends, is first determined. In this respect, the setting parameter E, P may, for example, comprise an optics setting parameter E of the optical component 15, in particular a half-scatter angle of the optical component 15, or a light setting parameter P of the spotlight 13 such as the already mentioned activation states of illuminants 25 of a lighting device 23 of the spotlight 13. The setting parameter E. P may furthermore, for example, also comprise a spacing of a lens 55 or of a reflector 56 from said lighting device 23 or spacings of such optical elements of the optical component from one another.

Subsequently, in the step 103, a memory 17 is read in which, for example, look-up tables or calculation rules for determining an approximation of the spatial light distribution V in dependence on the set value of the setting parameter E, P may be stored. Accordingly, in a subsequent step 105, a check may take place as to whether the memory 17 comprises a look-up table, from which an approximation of the producible spatial light distribution V may be read, for the respective determined value of the setting parameter E, P or whether the approximation for this value of the setting parameter E, P may be determined by means of a stored calculation rule.

If a look-up table is present, it may be read in a step 107 and the thus determined approximation of the spatial light distribution V at the determined value of the setting parameter E, P may be output in a final step 109.

For example, in such a look-up table, approximations of the spatial light distribution V that may actually be produced may be reproduced for a plurality of reference light distributions Z that may, for example, have been obtained in a preceding calibration step 201 by a plurality of measurements of the spatial light distribution V at different values E1, E2, E3 of the setting parameter E or P (cf. also FIG. 6). In particular in spotlight systems 11 that only enable a limited and discrete selection of values E1, E2, E3 of the setting parameter E or P, for example a discrete selection of possible half-scatter angles of an optical component 15, all of the possible producible spatial light distributions V may generally be determined from such look-up tables.

If, in contrast, no look-up table is available for the respective determined value of the optics setting parameter E, a calculation rule, based on which an approximation of the spatial light distribution V may be calculated, may be read from the memory 17 in a step 111. For example, such a calculation rule may define a rule for interpolation between respective reference light distributions Z1. Z2, Z3 to be able to determine an approximation of the producible spatial light distribution V at a value of the optics setting parameter E for which no reference light distribution Z is present. A linear interpolation between such reference light distributions Z may in particular be provided in this respect.

Furthermore, the calculation rule may comprise respective polynomial interpolations F for a plurality of spatial points r, said respective polynomial interpolations F describing the portion T of the light incident on a respective spatial point r1 in dependence on the optics setting parameter E. Such polynomial interpolations F may in this respect have been determined in a parameterization step 203 preceding the method, as FIG. 6 illustrates.

In this respect, a plurality of reference light distributions Z may first be measured in a calibration step 201 at different values E1, E2 and E3, here three values by way of example, of the optics setting parameter E (cf. FIG. 6). On the basis of these reference light distributions Z, a portion T of the light attributable to a spatial point, for example the spatial point r1, at the respective values E1, E2 and E3 of the optics setting parameter E may be determined for a plurality of spatial points r.

In a parameterization step 203, the thus determined portions T1, T2 and T3 that are incident on the spatial point r1 at the values E1, E2 and E3 of the optics setting parameter E may serve as sampling points by means of which a polynomial interpolation F may be determined that reflects the dependence of the portion T incident on the spatial point r1 on the optics setting parameter E. For example, the interpolation parameters $a_i$ of the polynomial interpolation F may be determined by fitting an Nth order polynomial function to the sampling points. Finally, the determined interpolation parameters at as well as the spatial point r1 may be stored in the memory 17 of the spotlight system 11 in a storage step 205. Alternatively or additionally, the reference light distributions Z1, Z2 and Z3 may, for example, be written to the memory 17 in the form of a respective look-up table so that, on a setting of the optics setting parameter E to one of the values E1, E2 or E3, such a table may be accessed directly and in a time-saving manner without a determination taking place.

Alternatively to such a calculation rule that is based on a plurality of polynomial interpolations F, other types of calculation rules may also be stored in the memory 17 and read in the step 111 (cf. FIG. 5). For example, the calculation rule may have been developed by means of one or more or different physical models or may be based thereon or on previous simulations.

In addition to determining the value of an optics setting parameter E in the step 101, a querying of further settings of the spotlight system 11 that may influence the producible spatial light distribution V may take place in a step 113. In addition to a half-scatter angle of the optical component 15 or a setting influencing the half-scatter angle, respective light setting parameters P, such as brightness and/or color settings, of the spotlight 13 may in this respect particularly be taken into account as a determined setting parameter E. Such a step 113 for querying further parameters P may generally take place at any desired point in time of the method shown in FIG. 5 and, if necessary, look-up tables may also be created that take into account the influence of further parameters P on the producible spatial light distribution V. Accordingly, also in the case of determining an approximation by means of a look-up table, further parameters P influencing the producible spatial light distribution V may also be determined in a step, not shown, before the step 105 or the step 107, or the step 113 may in particular also take place before step 105.

After the calculation rule as well as the values of all the parameters E. P of the spotlight system 11 to be taken into account have been determined, an approximation of the spatial light distribution V that is or may actually be produced may be determined on the basis of the calculation rule in a step 115. Only additions and subtractions may in particular be carried out in this determination to be able to obtain a result in a simple manner, and accordingly without a large calculation effort, and to be able to transmit it in real time. For example, the determined values of the relevant parameters E, P may in this respect be inserted into said polynomial interpolations F in order to determine an approximation of the spatial light distribution V. Finally, the determined approximation may be output in a step 117.

The method illustrated in FIG. 5 may generally be carried out in different variants. For example, only either look-up tables or calculation rules may in particular also be provided.

The spotlight systems 11, spotlights 13, and optical components 15 disclosed herein make it possible to determine light data that are as complete as possible, and in particular data on the spatial light distribution V that may be produced by means of an optical component 15, and to provide them in real time. Furthermore, the producible spatial light distribution V may also be determined in dependence on a settable optics setting parameter E of the optical component 15 or on other settable parameters, in particular light setting parameters P of the spotlight 13 or of the spotlight system 11, in particular by carrying out the method described so that light data may, for example, be provided for the postproduction of a film recording at any setting of a spotlight system 11.

REFERENCE NUMERAL LIST

11 spotlight system
13 spotlight
15 optical component
15*a* further optical component
17 memory
19 interface to the outside
21 calculation device
23 lighting device
25 illuminant
27 interface between optical component and spotlight
29 coupling device
30 coupling element of the spotlight
31 control device of the spotlight
32 coupling element of the optical component
33 control device of the optical component
34 ring
35 sensor
36 release mechanism
37 spotlight housing
39 handle
41 tripod
43 holding section
45 cable
47 coupling section
49 light exit opening
51 alignment device
53 support body
55 lens
56 reflector
57 external data collection device
59 adjustment device
61 selection device
63 detection device
101 determining a value of the setting parameter
103 reading the memory
105 checking
107 reading a look-up table
109 outputting an approximation
111 reading a calculation rule
113 querying settings of the spotlight system
115 determining an approximation
117 outputting the calculated approximation
201 calibration step
203 parameterization step
205 storage step
A pivot axis
$a_i$ parameters of the polynomial interpolation
E, E1, E2, E3 optics setting parameters
F polynomial interpolation
I information
L generated light
P light setting parameter
S adjustment direction
V producible spatial light distribution
Z, Z1, Z2, Z3 reference light distribution

The invention claimed is:

1. A spotlight system for illuminating a film or stage environment, said spotlight system comprising:
a spotlight for generating light; and
at least one optical component, couplable to the spotlight, for producing at least one spatial light distribution,
wherein at least one of the at least one optical component or the spotlight has a non-transitory memory in which information on the at least one spatial light distribution producible by the at least one optical component is stored, and
wherein the spotlight system has an interface that is configured to output the stored information or values derived from the stored information out of the spotlight system.

2. A spotlight system in accordance with claim 1,
wherein the stored information represents at least one of:
a spatial brightness distribution producible by the at least one optical component,
a spatial color distribution producible by the at least one optical component,
a spatial spectral distribution producible by the at least one optical component, or
light incident on respective spatial points when the at least one optical component is coupled to the spotlight.

3. A spotlight system in accordance with claim 1,
wherein the at least one spatial light distribution producible by the at least one optical component is varied by setting at least one optics setting parameter.

4. A spotlight system in accordance with claim 3,
wherein the stored information comprises at least a first piece of information that represents the at least one spatial light distribution producible by the at least one optical component at a first value of the at least one optics setting parameter; and
a second piece of information that represents the at least one spatial light distribution producible by the at least one optical component at a second value of the at least one optics setting parameter.

5. A spotlight system in accordance with claim 3, wherein the stored information comprises a calculation rule for determining the at least one spatial light distribution in dependence on the at least one optics setting parameter.

6. A spotlight system in accordance with claim 5, wherein the calculation rule comprises at least one respective polynomial interpolation for a plurality of spatial points, wherein the at least one respective polynomial interpolation describes a dependence of a portion of the producible light distribution at the respective spatial point on the at least one optics setting parameter.

7. A spotlight system in accordance with claim 1, wherein the spotlight system has a calculation device that is configured to determine the at least one spatial light distribution producible by the at least one optical component based on the information stored in the memory.

8. A spotlight system in accordance with claim 7, wherein the calculation device is configured to determine the at least one spatial light distribution producible by the at least one optical component also in dependence on a value of at least one settable light parameter of the spotlight, wherein the at least one settable light parameter of the spotlight includes at least one of a brightness value or a color value.

9. A spotlight system in accordance with claim 7, wherein the spotlight has a plurality of illuminants, wherein an activation state for each illuminant or a common activation state for a group of illuminants is settable; wherein the settable activation state of each illuminant comprises at least one of a switched-on state, a switched-off state, a switched-on state with a selected brightness or a switched-on state with a selected emission spectrum; and wherein the calculation device is configured to determine the at least one spatial light distribution producible by the at least one optical component in dependence on the set activation states of the plurality of illuminants.

10. A spotlight system in accordance with claim 7, wherein the spotlight system has an interface that is configured to output the determined at least one spatial light distribution.

11. A spotlight system in accordance with claim 1, wherein at least one of an article number or a serial number of the at least one optical component is stored in the non-transitory memory.

12. A spotlight system in accordance with claim 1, wherein at least one of a half-scatter angle or a luminosity value of the at least one optical component is stored in the non-transitory memory.

13. An optical component for a spotlight for illuminating a film or stage environment, wherein the optical component is couplable to a spotlight configured to generate light, wherein the optical component is configured to produce at least one spatial light distribution, wherein the optical component has a non-transitory memory in which information on the at least one spatial light distribution producible by the optical component is stored, and wherein the optical component has an interface from which the non-transitory memory can be read.

14. An optical component in accordance with claim 13, wherein the at least one spatial light distribution producible by the optical component is varied by setting an optics setting parameter.

15. An optical component in accordance with claim 13, wherein the optical component has a calculation device that is configured to determine the at least one spatial light distribution producible by the optical component based on the information stored in the non-transitory memory.

16. An optical component in accordance with claim 15, wherein the calculation device is configured to receive data from the coupled spotlight and to determine the at least one spatial light distribution producible by the optical component also in dependence on the received data.

17. A spotlight for generating light for illuminating a film or stage environment, said spotlight comprising a coupling device by means of which at least one replaceable optical component for producing at least one spatial light distribution is couplable to the spotlight; and a reading device that is configured to read information on the at least one spatial light distribution producible by the at least one optical component from a non-transitory memory of the at least one optical component when the at least one optical component is coupled to the spotlight.

18. A spotlight in accordance with claim 17, wherein the spotlight has a calculation device that is configured to determine the producible at least one spatial light distribution based on the information read.

19. A spotlight for generating light for illuminating a film or stage environment, said spotlight comprising an integrated optical component for producing at least one spatial light distribution; a non-transitory memory in which information on the at least one spatial light distribution producible by the optical component is stored; and an interface that is configured to output the stored information or values derived therefrom.

20. A spotlight in accordance claim 19, wherein the at least one spatial light distribution producible by the optical component is varied by setting at least one optics setting parameter.

21. A spotlight in accordance with claim 19, wherein the spotlight has a calculation device that is connected to the non-transitory memory and that is configured to determine the at least one producible spatial light distribution based on the information stored in the non-transitory memory.

22. A method of determining a spatial light distribution of a spotlight system that comprises a spotlight for generating light for illuminating a film or stage environment; and a replaceable or integrated optical component for producing at least one spatial light distribution, wherein the at least one producible spatial light distribution depends on a set value of at least one setting parameter of the spotlight system, comprising the steps: determining the set value of the at least one setting parameter; and determining an approximation of the at least one producible spatial light distribution at the set value of the at least one setting parameter based on at least one of a calculation rule or a look-up table.

23. A method in accordance with claim 22,
wherein the at least one setting parameter comprises at least one of
an optical setting parameter of the optical component that includes a half-scatter angle of the optical component, or
a light setting parameter of the spotlight that includes an activation state of a lighting device of the spotlight, a brightness setting of the spotlight or a color setting of the spotlight.

24. A method in accordance with claim 22,
wherein the approximation of the at least one producible spatial light distribution is determined based on the calculation rule,
wherein the determination of the approximation of the at least one producible spatial light distribution based on the calculation rule does not comprise any operations other than additions, subtractions, or multiplications.

25. A method in accordance with claim 22,
wherein the approximation of the at least one producible spatial light distribution is determined based on the look-up table,
wherein the look-up table comprises a plurality of approximations for reference light distributions at a plurality of respective reference values of the setting parameter.

26. A method in accordance with claim 22,
wherein the approximation of the at least one producible spatial light distribution is determined based on the calculation rule,
wherein the calculation rule defines a rule for an interpolation between a first reference light distribution at a first reference value of the setting parameter and a second reference light distribution at a second reference value of the setting parameter.

27. A method in accordance with claim 22,
wherein the approximation of the at least one producible spatial light distribution is determined based on the calculation rule,
wherein, in a parameterization step, the calculation rule is determined based on at least a first reference light distribution at a first reference value of the setting parameter and on at least a second reference light distribution at a second reference value of the setting parameter.

28. A method in accordance with claim 27,
wherein, in the parameterization step, a respective polynomial interpolation is performed for a plurality of predefined or predefinable spatial points in order to parameterize the light incident on the respective spatial point in dependence on the setting parameter,
wherein interpolation parameters of the polynomial interpolations are determined based on the reference light distributions,
wherein the calculation rule comprises the respective polynomial interpolations for the plurality of spatial points.

29. A method in accordance with claim 28,
wherein the interpolation parameters of the polynomial interpolations and the respective spatial points are stored in a non-transitory memory of the spotlight or in a non-transitory memory of the optical component.

* * * * *